(12) United States Patent
Hermesh et al.

(10) Patent No.: US 10,652,627 B2
(45) Date of Patent: May 12, 2020

(54) CONTROLLING DIGITAL VIDEO BANDWIDTH UTILIZATION WITH A VIRTUALIZED COMMUNICATION HUB

(71) Applicant: Intel Corporation, Santa Clara, CA (US)

(72) Inventors: Barak Hermesh, Pardes Hana (IL); Ziv Kfir, Yavne (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/476,096

(22) Filed: Mar. 31, 2017

(65) Prior Publication Data

US 2018/0288493 A1    Oct. 4, 2018

(51) Int. Cl.
| | |
|---|---|
| *H04N 21/647* | (2011.01) |
| *H04N 21/61* | (2011.01) |
| *H04N 21/222* | (2011.01) |
| *H04N 21/262* | (2011.01) |
| *H04N 21/24* | (2011.01) |
| *H04N 21/2343* | (2011.01) |
| *H04N 21/2385* | (2011.01) |

(Continued)

(52) U.S. Cl.
CPC ..... *H04N 21/64738* (2013.01); *H04N 21/222* (2013.01); *H04N 21/2385* (2013.01); *H04N 21/2393* (2013.01); *H04N 21/23805* (2013.01); *H04N 21/234309* (2013.01); *H04N 21/2402* (2013.01); *H04N 21/2408* (2013.01); *H04N 21/26216* (2013.01); *H04N 21/6118* (2013.01); *H04N 21/64769* (2013.01); *H04N 21/64792* (2013.01)

(58) Field of Classification Search
CPC ........ H04N 21/222; H04N 21/234309; H04N 21/23805; H04N 21/2385; H04N 21/2393; H04N 21/2402; H04N 21/2408; H04N 21/26216; H04N 21/64738; H04N 21/64769

See application file for complete search history.

(56) References Cited

U.S. PATENT DOCUMENTS

| | | | |
|---|---|---|---|
| 2007/0177632 A1* | 8/2007 | Oz ..................... | H04N 7/17318 370/486 |
| 2009/0003436 A1* | 1/2009 | Levin ............... | H04N 21/23430 375/240.02 |

(Continued)

*Primary Examiner* — Jeremy S Duffield
(74) *Attorney, Agent, or Firm* — Hanley, Flight & Zimmerman, LLC

(57) ABSTRACT

Example methods, apparatus, systems and articles of manufacture (e.g., physical storage media) to control digital video bandwidth utilization with a virtualized communication hub are disclosed. Example methods disclosed herein include monitoring, with a virtual access function of the virtualized communication hub, an aggregate load on a broadband access medium to detect bandwidth utilization events. Disclosed example methods also include sending, from the virtual access function, a first notification message to a virtual set-top box of the virtualized communication hub in response to detecting a first bandwidth utilization event. Disclosed example methods further include adjusting, at the virtual set-top box and based on the first notification message, an output bandwidth for streaming digital media from the virtual set-top box to a physical set-top box via a broadband access medium.

22 Claims, 9 Drawing Sheets

(51) Int. Cl.
*H04N 21/238* (2011.01)
*H04N 21/239* (2011.01)

(56) References Cited

U.S. PATENT DOCUMENTS

| | | | | |
|---|---|---|---|---|
| 2010/0100914 A1* | 4/2010 | Sugiyama | ........... | H04L 65/4069 |
| | | | | 725/109 |
| 2013/0276015 A1* | 10/2013 | Rothschild | ......... | H04N 21/2387 |
| | | | | 725/25 |
| 2014/0082681 A1* | 3/2014 | Brown | ............. | H04N 21/64723 |
| | | | | 725/98 |

* cited by examiner

CONTROLLING DIGITAL VIDEO BANDWIDTH UTILIZATION WITH A VIRTUALIZED COMMUNICATION HUB

FIELD OF THE DISCLOSURE

This disclosure relates generally to digital video transmission and, more particularly, to controlling digital video bandwidth utilization with a virtualized communication hub.

BACKGROUND

In broadband service provider networks, such as cable and fiber optic broadband networks, the streaming of non-linear digital video, such as digital video provided by a video-on-demand (VOD) service, a digital video recorder (DVR), service, etc., induces extra network load. For example, such network load can be in the form of increased bandwidth utilization on the broadband access medium (e.g., the cable access medium, the fiber optic access medium, etc.). Increased bandwidth utilization can become especially problematic for smart subscriber sites, such as smart subscriber residences, with multiple media devices capable of streaming digital video simultaneously. When bandwidth utilization on the broadband access medium reaches the point of congestion, digital video streaming may suffer packet loss, resulting in quality of service degradation and an associated poor subscriber experience.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
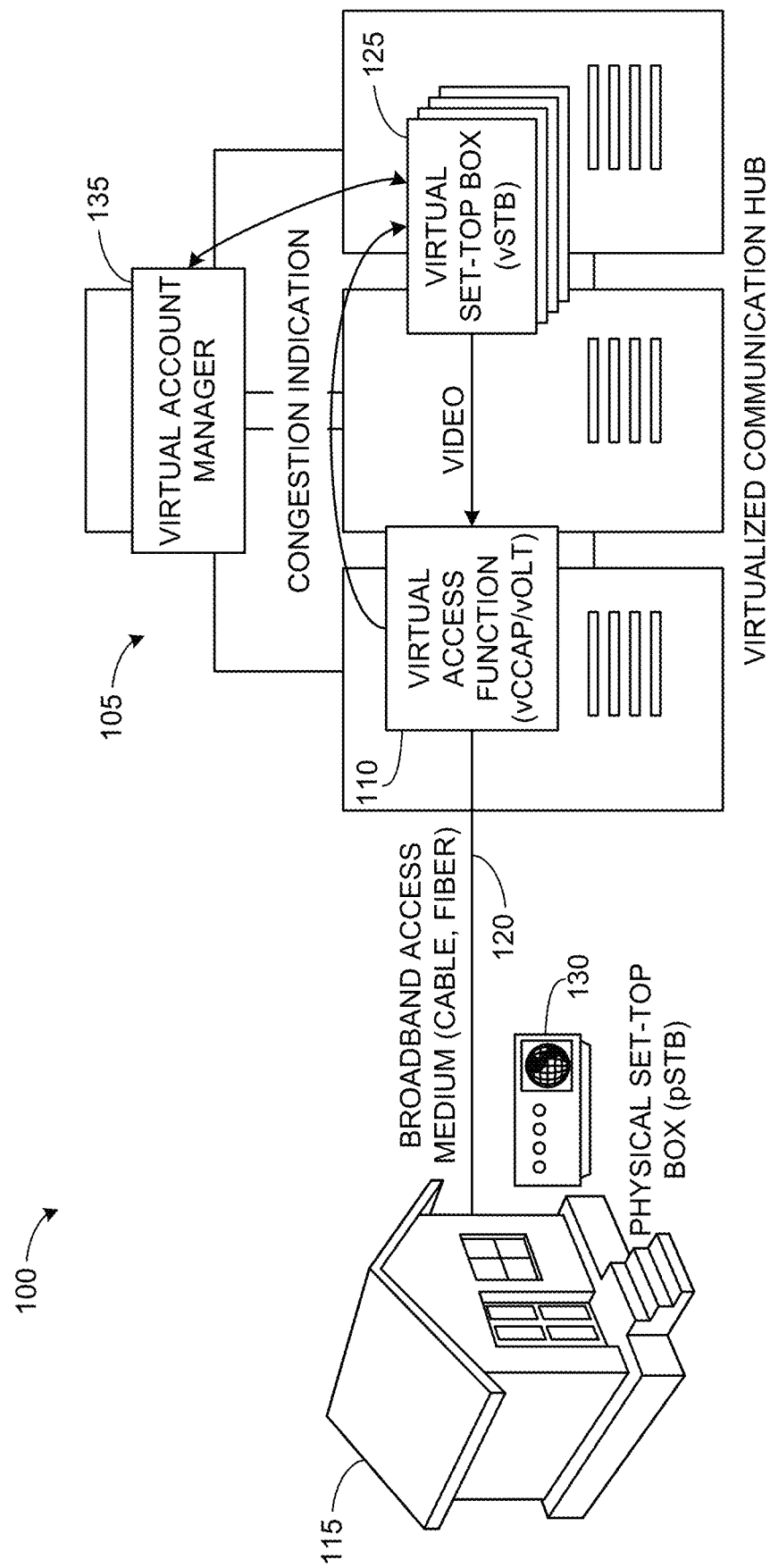
FIG. 1 is a block diagram of an example digital video communication system including an example virtualized communication hub structured to control digital video bandwidth utilization in accordance with the teachings of this disclosure.

Example methods, apparatus, systems and articles of manufacture (e.g., physical storage media) to control digital video bandwidth utilization with a virtualized communication hub are disclosed herein. Example methods disclosed herein to control digital video bandwidth utilization with a virtualized communication hub implemented by a server cluster include monitoring, with a virtual access function of the virtualized communication hub, an aggregate load on a broadband access medium to detect bandwidth utilization events. Disclosed example methods also include sending, from the virtual access function, a first notification message to a virtual set-top box of the virtualized communication hub in response to detecting a first bandwidth utilization event. Disclosed example methods further include adjusting, at the virtual set-top box and based on the first notification message, an output bandwidth for streaming digital media from the virtual set-top box to a physical set-top box via a broadband access medium. In some such disclosed example methods, the virtual set-top box is to adjust the output bandwidth for streaming the digital media based on the first notification message and a profile of a subscriber associated with the virtual set-top box.

Some disclosed example methods also include registering the virtual set-top box with the virtual access function to permit the virtual set-top box to receive notification messages. For example, such registering can be performed in response to an access request message received by the virtual access function from the virtual set-top box prior to the first notification message being sent.

Additionally or alternatively, some disclosed example methods include reserving resources of the broadband access medium for use by the virtual set-top box to stream the digital media in response to a reservation request received from the virtual set-top box after the first notification message being sent. Furthermore, in some such disclosed example methods include, in response to detecting a second bandwidth utilization event: (i) adjusting the resources of the broadband access medium reserved for use by the virtual set-top box to stream the digital media; and (ii) sending a second notification message from the virtual access function to the virtual set-top box, the virtual set-top box to further adjust the output bandwidth for streaming the digital media based on the second notification message.

Additionally or alternatively, in some disclosed example methods, the monitoring of the aggregate load with the virtual access function includes comparing the monitored aggregate load to a first bandwidth utilization threshold, and detecting the first bandwidth utilization event when the monitored aggregate load increases to reach the first bandwidth utilization threshold. In such examples, the first bandwidth utilization event is associated with the monitored aggregate load having reached the first bandwidth utilization threshold. In some such disclosed example methods, the first notification message indicates the monitored aggregate load has reached the first bandwidth utilization threshold, and the adjusting of the output bandwidth at the virtual set-top box includes controlling a transcoder of the virtual set-top box to encode a data stream for streaming the digital video with a secondary codec associated with a lower bandwidth than a primary codec of the virtual set-top box to reduce the output bandwidth for streaming the digital media.

Additionally or alternatively, in some disclosed example methods, the monitoring of the aggregate load with the virtual access function includes comparing the monitored aggregate load to a second bandwidth utilization threshold lower than the first bandwidth utilization threshold, and detecting a second bandwidth utilization event when the monitored aggregate load decreases to reach the second bandwidth utilization threshold. In such examples, the second bandwidth utilization event is associated with the monitored aggregate load having reached the second bandwidth utilization threshold. Some such disclosed example methods further include, in response to detecting the second bandwidth utilization event: (i) sending a second notification message from the virtual access function to the virtual set-top box, with the second notification message indicating the monitored aggregate load has reached the second bandwidth utilization threshold; and (ii) controlling, at the virtual set-top box in response to receiving the second notification message, the transcoder to switch from the secondary codec to the primary codec to encode the data stream for streaming the digital media.

Additionally or alternatively, in some disclosed example methods, the monitoring of the aggregate load with the virtual access function includes comparing the monitored aggregate load to a third bandwidth utilization threshold higher than the first bandwidth utilization threshold, and detecting a third bandwidth utilization event when the monitored aggregate load increases to reach the third bandwidth utilization threshold. In such examples, the third bandwidth utilization event is associated with the monitored aggregate load having reached the third bandwidth utilization threshold. Some such disclosed example methods further include, in response to detecting the third bandwidth utilization event: (i) sending a third notification message from the virtual access function to the virtual set-top box, with the third notification message indicating the monitored aggregate load has reached the third bandwidth utilization threshold; and (ii) controlling, at the virtual set-top box in response to receiving the third notification message, the transcoder to encode the data stream for streaming the digital media with a tertiary codec associated with a lower bandwidth than the secondary codec to further reduce the output bandwidth for streaming the digital media.

Additionally or alternatively, in some disclosed example methods, the monitoring of the aggregate load with the virtual access function includes comparing the monitored aggregate load to a fourth bandwidth utilization threshold lower than the third bandwidth utilization threshold but higher than the first bandwidth utilization threshold, and detecting a fourth bandwidth utilization event when the monitored aggregate load decreases to reach the fourth bandwidth utilization threshold. In such examples, the fourth bandwidth utilization event is associated with the monitored aggregate load having reached the fourth bandwidth utilization threshold. Some such disclosed example methods further include, in response to detecting the fourth bandwidth utilization event: (i) sending a fourth notification message from the virtual access function to the virtual set-top box, the fourth notification message indicating the monitored aggregate load has reached the fourth bandwidth utilization threshold; and (ii) controlling, at the virtual set-top box in response to receiving the fourth notification message, the transcoder to switch from the tertiary codec to the secondary codec to encode the data stream for streaming the digital media.

These and other example methods, apparatus, systems and articles of manufacture (e.g., physical storage media) to control digital video bandwidth utilization with a virtualized communication hub are disclosed in further detail below.

In broadband service provider networks, such as cable and fiber optic broadband networks, the broadband access medium is shared by multiple subscribers. As such, the traffic load of one subscriber may affect the traffic loads of other subscribers. For economic reasons, a provider often substantially oversubscribes its broadband service provider networks, with the assumption that only a relatively small fraction of subscribers will utilize the network at any given time. For many types of network traffic, such oversubscription does not lead to quality of service or user experience issues.

However, streaming of nonlinear digital video, such as digital video provided by a VOD service, a DVR service, etc., in broadband service provider networks can induce substantial extra network load, such as increased bandwidth utilization on the broadband access medium. When bandwidth utilization on the broadband access medium reaches the point of congestion, digital video streaming may suffer packet loss, resulting in quality of service degradation and an associated poor subscriber experience. Prior corrective measures employed in broadband service provider networks are either non-existent, or include controlled dropping of packets, which still results in a degraded subscriber experience, and/or reactive requests driven by the consumer premises equipment (CPE), such as the subscriber's set-top box (STB), to transcode the digital video stream using a codec that consumes less bandwidth. However, the latter technique also has disadvantages. For example, CPE reactive requests are driven by detection of packet loss (and/or a streaming underrun) and, thus, are still susceptible to a poor subscriber experience due to packet loss, at least during the transition period from when packet loss is detected to when the CPE request is acted upon to vary the transcoding to reduce bandwidth utilization and mitigate the congestion. CPE reactive requests are also local decisions with little to no centralized control. As such, a decision made by the CPE of one subscriber may affect the bandwidth available to another video stream for a different subscriber such that the other video stream suffers degraded quality of service, which results in a poorer overall subscriber experience.

Unlike such prior corrective measures for mitigating congestion of broadband service provider networks, example methods, apparatus, systems and articles of manufacture (e.g., physical storage media) disclosed herein leverage modern network architectures built upon a virtualized communication hub to provide centralized, proactive control of digital video bandwidth utilization. As described in further detail below, a virtualized communication hub is a cluster of servers in a virtualized service provider network that implement network functions, such as virtual network access functions and virtual STBs, by applying software defined networking (SDN) and network function virtualization (NFV) concepts. In such a virtualized environment, a subscriber's STB includes a physical STB (pSTB), which is a physical element located at the subscriber site (e.g., the subscriber's premises), and a virtual STB (vSTB) located at (e.g., implemented by) the virtualized communication hub. As disclosed in further detail below, the vSTB in such virtualized environments is responsible for implementing video processing functionality, such as a transcoder and a cloud DVR.

Examples disclosed herein leverage the centralized location of the virtual access function and vSTBs in the virtualized communication hub to control digital video bandwidth utilization to better manage network congestion and apply corrective measures in advance, possibly before any degradation in quality of service or subscriber experience occurs. In some disclosed examples of controlling digital video bandwidth utilization, an example virtualized communication hub implements an example virtualized access function to provide subscribers registered with a given access network of a given broadband service provider network with access to that broadband network. The example virtualized communication hub also implements vSTBs for the respective registered subscribers. In some such examples, the virtualized access function monitors the aggregate downstream load in the network caused by the combination of the digital video streams being transmitted by the vSTBs to the different subscribers registered with the access network. The virtualized access function performs such aggregate load monitoring to determine whether the monitored load increases or decreases to reach (or cross) a given bandwidth utilization threshold (of one or more possible thresholds). When the given threshold is reached, and depending on the particular threshold that is reached and whether the monitored load is increasing or decreasing, the virtualized access function sends a corresponding notification message to the vSTBs registered with the given access network to signal that an associated bandwidth utilization event corresponding to the particular threshold has occurred. The signaled vSTBs then adjust their respective transcoders to, for example, select appropriate codecs (e.g., based on respective subscriber profiles) to increase or decrease their respective output bandwidths for streaming media. In this way, example techniques disclosed herein to control digital video bandwidth utilization are able to adjust the aggregate access network loads to proactively avoid, or at least mitigate, congestion in broadband service provider networks.

Turning to the figures, a block diagram of an example digital video communication system 100 including an example virtualized communication hub 105 structured to control digital video bandwidth utilization in accordance with the teachings of this disclosure is illustrated in FIG. 1. In the illustrated example of FIG. 1, the digital video communication system 100 corresponds to an example broadband service provider network, such as, but not limited to, a cable and/or fiber optic broadband network. However, the examples of controlling digital video bandwidth utilization disclosed herein are not limited thereto, but may be used with any digital video communication system employing a virtualized communication hub or similar technology to provide centralized network access and set-top box functionality, and/or similar functionality to provide and manage transmission (e.g., streaming) of digital video.

In the illustrated example of FIG. 1, the virtualized communication hub 105 is a cluster of servers in the example digital video communication system 100 (e.g., a virtualized service provider network 100) that implement network functions by applying SDN and NFV concepts. For example, the virtualized communication hub 105 includes (e.g., implements) an example virtual network access function (vAF) 110 to provide example subscribers 115 registered with a given access network of the digital video communication system 100 (e.g., the broadband service provider network) with access to the system via an example broadband access medium 120. For example, if the broadband access medium 120 includes or is otherwise implemented by a cable-based medium, the vAF 110 can implement an example virtual converged cable access platform (vCCAP) to provide one or more of the subscribers 115 with access to the system/network. Additionally or alternatively, in examples in which the broadband access medium 120 includes or is otherwise implemented by a fiber-based medium, the vAF 110 can implement an example virtual optical line terminal (vOLT) to provide one or more of the subscribers 115 with access to the system/network The example virtualized communication hub 105 of FIG. 1 also includes (e.g., implements) example vSTBs 125 to provide the example subscribers 115 with set-top box functionality to receive digital video in the system 100. In the illustrated example of FIG. 1, the system 100 provides set-top box functionality to a given subscriber 115 through an example vSTB 125 implemented in the virtualized communication hub 105 and an example pSTB 130 located at the subscriber site (e.g., subscriber premises). In some examples, the pSTB 130 for a given subscriber 115 in such a virtualized environment provides a physical interface between the broadband access medium 120 and the subscriber's media presentation device(s), such as a television and/or other media device, as well as a user interface to access (e.g., stream) video and/or access other features provided by the example system 100. In some examples, the pSTB 130 is integrated in or otherwise implemented by the subscriber's media presentation device. For example, functionality associated with the example pSTB 130 of FIG. 1 can be implemented by one or more software modules executed by a smart television or other display device, a personal computer, etc. In some examples, the pSTB 130 is implemented by one or more devices separate from the subscriber's media presentation device. For example, functionality associated with the example pSTB 130 of FIG. 1 can be implemented by a set-top box device separate from but communicatively coupled to the subscriber's media presentation device (e.g., via a high-definition multimedia interface (HDMI) cable, a coaxial cable, a wireless connection, etc.), a digital video recorder (DVR) device separate from but communicatively coupled to the subscriber's media presentation device (e.g., via an HDMI cable, a coaxial cable, a wireless connection, etc.), a digital versatile disk (DVD) player separate from but communicatively coupled to the subscriber's media presentation device (e.g., via an HDMI cable, a coaxial cable, a wireless connection, etc.), a gaming console separate from but communicatively coupled to the subscriber's media presentation device (e.g., via an HDMI cable, a coaxial cable, a wireless connection, etc.), etc. In some examples, the pSTB 130 is implemented by a combination of functionality provided by the subscriber's media presentation device and functionality provided by one or more external devices, such as, but not limited to, a set-top box device, a DVR device, a DVD player, a gaming console, etc.

In some examples, the vSTB 125 for a given subscriber 115 in such a virtualized environment is responsible for implementing video processing functionality, such as a transcoder and a cloud DVR, to provide digital video to the subscriber's pSTB 130 via the broadband access medium 120. For example, the vSTB 125 included in the virtualized communication hub 105 for a given subscriber 115 implements a transcoder capable of changing the encoding of a digital video stream to be sent to the subscriber's pSTB 130. In some examples, the transcoder of the vSTB 125 selects one of several available codecs associated with different output bandwidths for encoding the digital video stream. (In some examples, different ones of the codecs may implement different encoding algorithms to support pSTBs 120 having different decoding capabilities.) By selecting among the different available codecs, the transcoder of the vSTB 125 can vary the bandwidth of the broadband access medium 120 utilized by the vSTB 125 to stream digital video to the subscriber's pSTB 130 to thereby adjust the aggregate load in the system 100.

In some examples, the transcoder of the vSTB 125 bases its codec selection on a subscriber profile retrieved by the vSTB 125 from an example virtual account manager (vAM) 135 implemented by or otherwise included in the virtualized communication hub 105. In the illustrated example, the vAM 135 stores and maintains profiles and other account information associated with the respective subscribers 115. Example subscriber profiles specify, among other things, characteristics of the services to which the respective subscribers 115 have subscribed. For example, the subscriber profiles may specify a target quality of service (QoS) for digital video streamed to the respective subscribers 115. In some such examples, the transcoder of the vSTB 125 for a given subscriber 115 may limit/restrict its codec selection to a subset of available codecs capable of meeting the QoS targets specified in the subscriber's profile retrieved by the vSTB 125 from the vAM 135.

In some examples, the vSTB 125 included in the virtualized communication hub 105 for a given subscriber 115 implements a cloud DVR for the subscriber. In some such examples, the cloud DVR of the vSTB 125 for a given subscriber 115 provides functionality to record, store and play back video content for the subscriber, with the storage and DVR functions being implemented by the virtualized communication hub 105. The subscriber is able to control the DVR functionality via a user interface implemented by the subscriber's pSTB 130.

In the illustrated example of FIG. 1, the vAF 110 and the vSTBs 125 implemented by the virtualized communication hub 105 collaborate to control digital video bandwidth utilization of the broadband access medium 120 in accordance with the teachings of this disclosure. For example, the vAF 110 monitors the aggregate downstream load on the broadband access medium 120 of the system 100 (and/or anywhere else in the system 100, such as within the virtualized communication hub 105) caused by the combination of the digital video streams being transmitted by the vSTBs 125 to the different subscribers 115 registered with the access network served by the vAF 110. The vAF 110 performs such aggregate load monitoring to determine whether the monitored load increases or decreases to reach (or cross) a given bandwidth utilization threshold (of one or more possible thresholds). When the given threshold is reached, and depending on the particular threshold that is reached and whether the monitored load is increasing or decreasing, the vAF 110 sends a corresponding notification message to the vSTBs 125 registered with the vAF 110, which signals that an associated bandwidth utilization event corresponding to the particular threshold has occurred. In response to the notification message, the signaled vSTBs 125 adjust their respective transcoders to, for example, select appropriate codecs (e.g., based on respective subscriber profiles retrieved form the vAM 135) to increase or decrease their respective output bandwidths for streaming media. In this way, the example vAF 110, in conjunction with the vSTBs 125, control digital video bandwidth utilization on the broadband access medium 120 in the aggregate to proactively avoid, or at least mitigate, congestion in the example digital video communication system 100.

Figure 2:
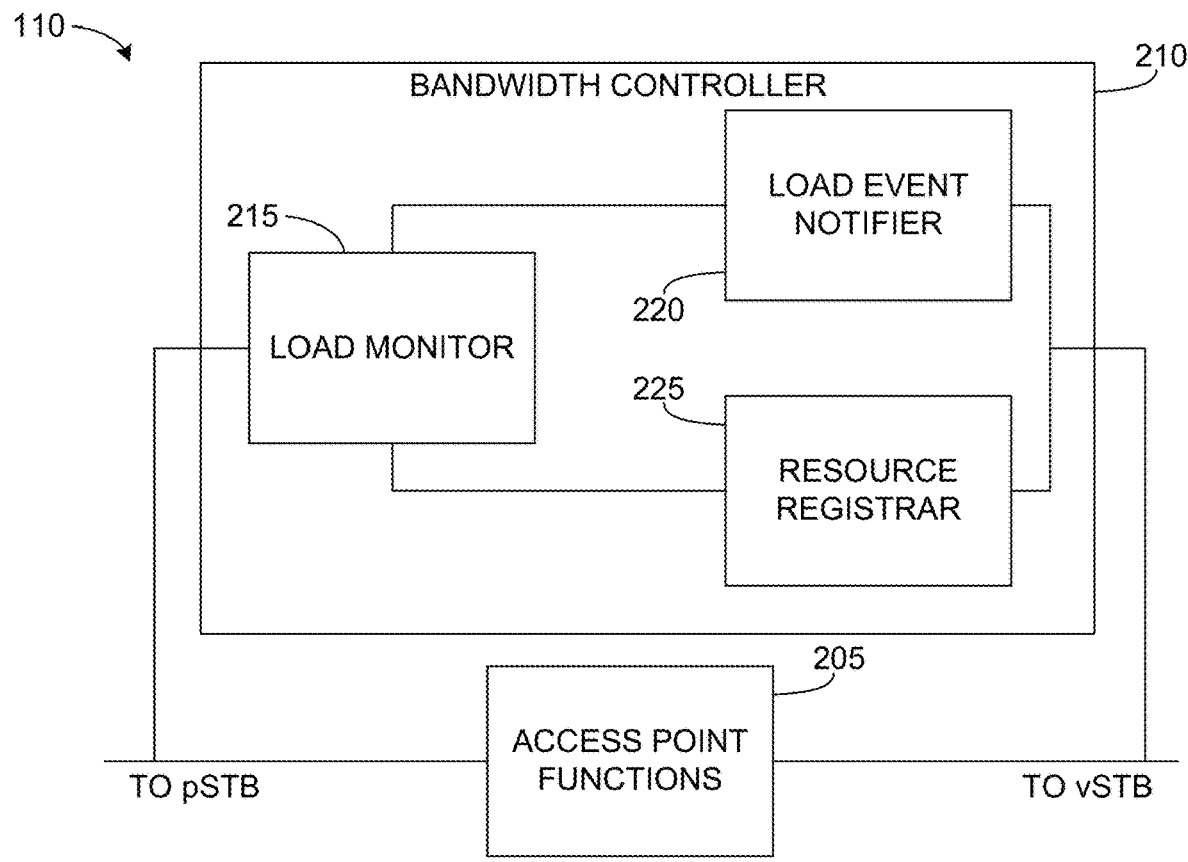
FIG. 2 is a block diagram of an example virtual set-top box implemented in the example virtualized communication hub of FIG. 1.

A block diagram of an example implementation of the vAF 110 of FIG. 1 is illustrated in FIG. 2. The example vAF 110 of FIG. 2 includes example access point functions 205, which include SDN/NFV elements relied upon by the vAF 110 to provide registered subscribers 115 with access to the digital video communication system 100 (e.g., which may be a virtualized service provider network 100). For example, the access point functions 205 can include, but are not limited to, SDN/NFV elements structured to implement one or more of a vCCAP, an OLT, routers, bridges, switches, etc., and/or any combination thereof.

To control digital video bandwidth utilization in the system 100 in accordance with the teachings of this disclosure, the example vAF 110 of FIG. 2 also includes an example bandwidth controller 210, which further includes an example load monitor 215, an example load event notifier 220 and an example resource registrar 225. The example load monitor 215 monitors the aggregate downstream load on the broadband access medium 120 of the system 100 (and/or anywhere else in the system 100, such as within the virtualized communication hub 105). In some examples, the load monitor 215 monitors (e.g., continuously, periodically at a given measurement interval, based on occurrence of one or more events, etc., and/or any combination thereof) the aggregate downstream load by determining the bandwidths (or data rates) of the respective digital video streams being transmitted by the vSTBs 125 to the different subscribers 115 registered with the access network served by the vAF 110. The load monitor 215 then sum/accumulates or otherwise combines the bandwidths (or data rates) of the respective digital video streams to determine the aggregate downstream load.

Figure 5:
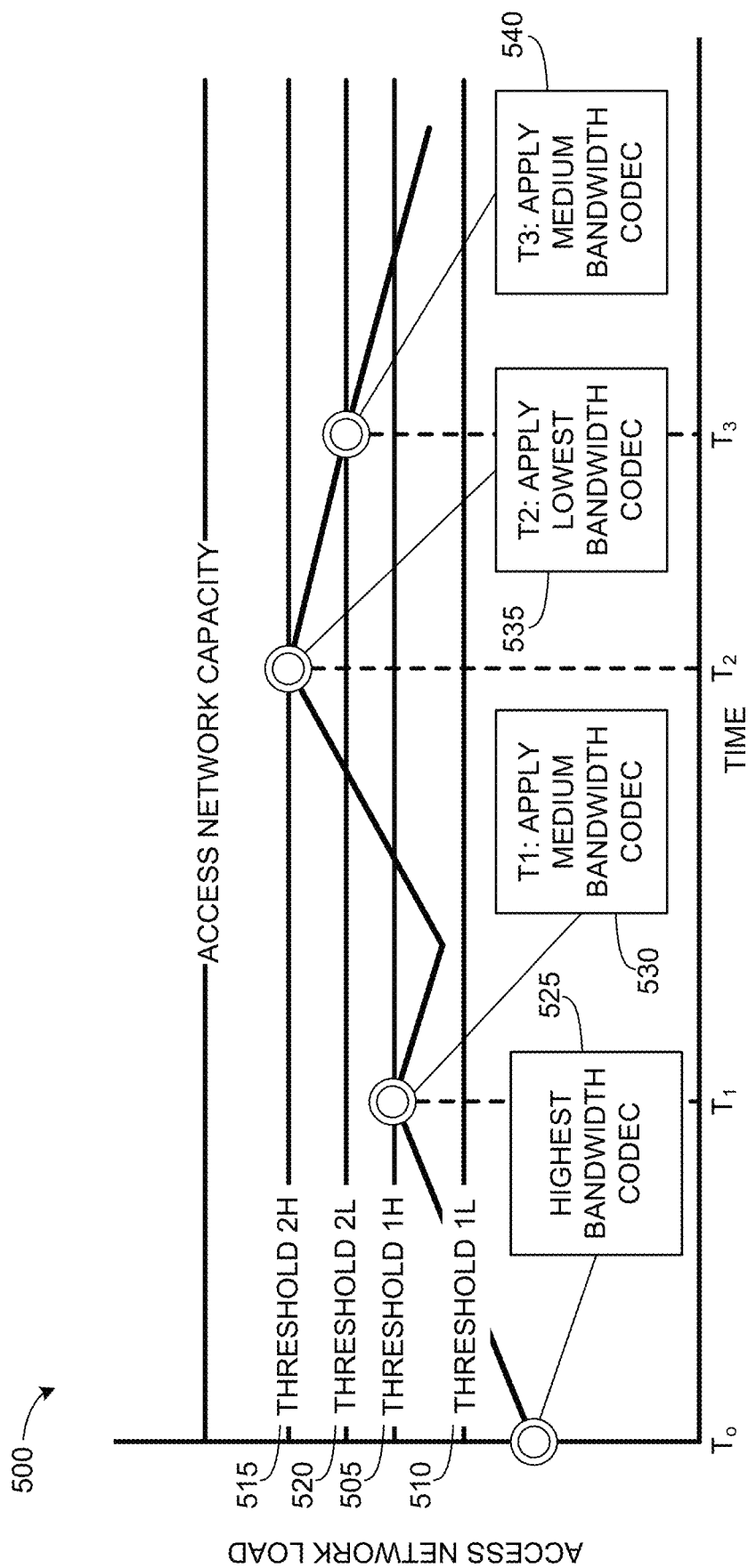
FIG. 5 illustrates an example of digital video bandwidth utilization being varied by the illustrated example virtualized communication hub in the example digital video communication system of FIG. 1 in accordance with the teachings of this disclosure.

The example load event notifier 220 evaluates the aggregate downstream load monitored by the load monitor 215 to determine whether the downstream load has reached (or crossed) a given bandwidth utilization threshold (of one or more possible thresholds). When a given bandwidth utilization threshold is reached (or crossed), the example load event notifier 220 also determines whether the aggregate downstream load was increasing or decreasing. Then, based on the particular bandwidth utilization threshold, and whether the aggregate downstream load was increasing or decreasing when the threshold was reached (or crossed), the example load event notifier 220 sends a corresponding notification message to the vSTBs 125 registered with the vAF 110. The notification message informs the vSTBs 125 that a bandwidth utilization event corresponding to the aggregate downstream load reaching the particular bandwidth utilization threshold has occurred. Examples of bandwidth utilization thresholds used by the load event notifier 220 and associated bandwidth utilization events corresponding to these thresholds are illustrated in FIG. 5, which is described in further detail below. In some examples, the load event notifier 220 is also responsible for registering vSTBs 125 to receive the event notifications.

The example resource registrar 225 reserves resources on the broadband access medium 120 of the system 100 (and/or anywhere else in the system 100, such as within the virtualized communication hub 105) for use by registered vSTBs 125 to stream digital video. For example, in response to a reservation request received from a particular one of the vSTBs 125, the resource registrar 225 can reserve a portion of the downstream bandwidth of the broadband access medium 120 for use by the requesting vSTBs 125 to stream digital video. In some examples, the amount of reserved resources is based on the evaluation of the aggregate downstream load performed by the load event notifier 220. For example, a requesting vSTB 125 can vary the amount of resources (e.g., bandwidth) specified in its reservation request to correspond to its current codec selection, which is made based on the notification messages received from the example load event notifier 220. In some examples, the resource registrar 225 further supports resource negotiation to allow the resource registrar 225 and the requesting vSTB 125 to iteratively settle on the amount of resources (e.g., bandwidth) to be reserved for that vSTB 125.

Figure 3:
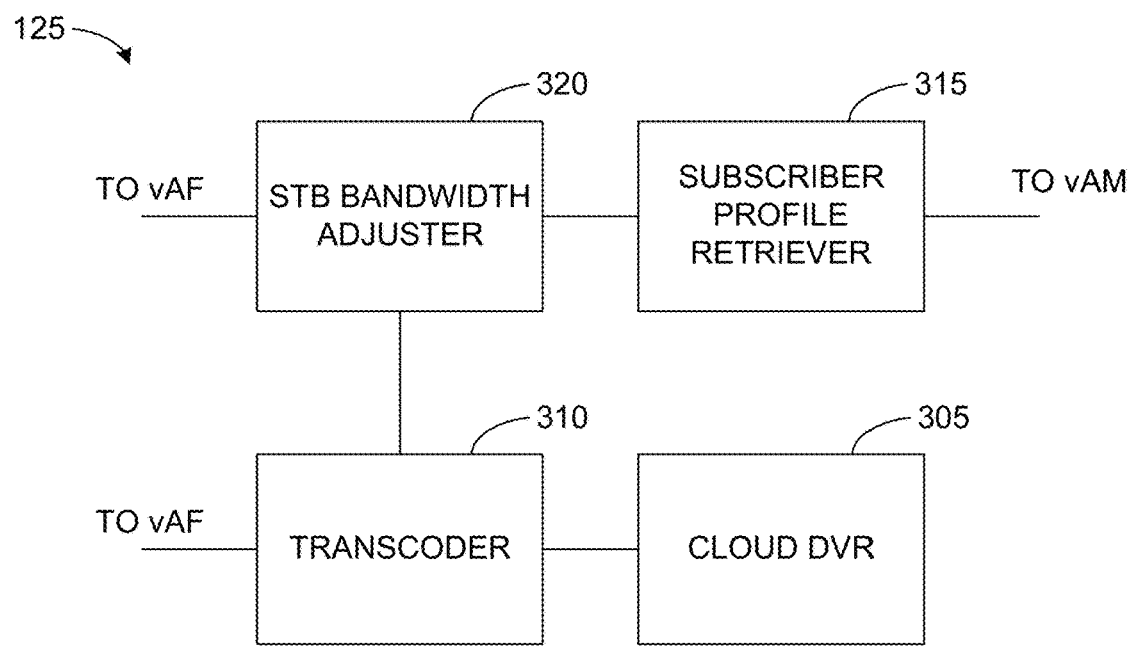
FIG. 3 is a block diagram of an example virtual access function implemented in the example virtualized communication hub of FIG. 1.

A block diagram of an example implementation of the vSTB 125 of FIG. 1 is illustrated in FIG. 3. The example vSTB 125 of FIG. 3 includes, among other STB functionality not shown, an example cloud DVR 305 to record, store and play back video content for a subscriber 115. The example cloud DVR 305 also implements DVR control features, such as start, stop, pause, fast forward, rewind, scheduled recording, etc. In some examples, such features are invoked by commands entered by the subscriber 115 via the subscriber's pSTB 130.

The example vSTB 125 of FIG. 3 also includes an example transcoder 310 capable of changing the encoding of a digital video stream to be sent to the subscriber's pSTB 130 associated with the vSTB 125. In the illustrated example, the transcoder 310 implements several available codecs associated with different output bandwidths (e.g., data rates) for encoding the digital video stream. For example, the transcoder 310 may implement a primary codec having an output bandwidth corresponding to the highest (maximum) bandwidth allocated by the system 100 to the vSTB 125 for transmitting video data, a secondary codec (e.g., intermediate codec) having an output bandwidth lower than primary codec, a tertiary codec (e.g., low bandwidth codec) having an even lower bandwidth than the secondary codec, etc. The transcoder 310 of the illustrated example selects among the different available codecs to vary the bandwidth of the broadband access medium 120 utilized by the vSTB 125 to stream digital video to the subscriber's pSTB 130.

In some examples, the set of available codecs selectable by the transcoder 310 is limited or otherwise specified by a subscriber profile associated with the vSTB 125 (or with a subscriber 115 associated with the vSTB 125) retrieved by an example subscriber profile retriever 315. The example vSTB 125 of FIG. 3 includes the subscriber profile retriever 315 to retrieve the subscriber profile from the vAM 135. For example, the subscriber profile retriever 315 may retrieve the subscriber profile from the vAM 135 upon startup/instantiation of the vSTB 125 in the virtualized communication hub 105, at scheduled retrieval intervals, in response to the occurrence of one or more events, etc., and/or any combination thereof.

The subscriber profile retrieved by the subscriber profile retriever 315 specifies characteristics of the subscriber's account. In some examples, the subscriber profile specifies a target QoS for digital video streamed to the respective subscriber 115 associated with the vSTB 125. In such examples, the transcoder 310 may limit/restrict its codec selection to a subset of the available codecs capable of meeting the QoS targets specified in the subscriber's profile. For example, the subscriber profile may indicate that the subscriber 115 has subscribed to a basic video service having a low QoS target. In such an example, the transcoder 310 may permit selection of any one of its primary codec, secondary codec or tertiary codec for encoding digital video to be streamed to the associated pSTB 130. In another example, the subscriber profile may indicate that the subscriber 115 has subscribed to a premium video service having a high QoS target. In such an example, the transcoder 310 may permit selection of its primary codec or secondary codec (or, in some examples, just the primary codec) for encoding digital video to be streamed to the associated pSTB 130, but not permit selection of its tertiary codec (or, in some examples, its tertiary codec or secondary codec). In some examples, the subscriber profile expressly specifies the set of available codecs capable of being selected by the transcoder 310 for encoding video data for streaming.

To control digital video bandwidth utilization in the system 100 in accordance with the teachings of this disclosure, the example vSTB 125 of FIG. 3 also includes an example STB bandwidth adjuster 320. The STB bandwidth adjuster 320 of the illustrated example registers the vSTB 125 with the vAF 110 to receive notification messages associated with bandwidth utilization events. The STB bandwidth adjuster 320 further processes a notification message received from the vAF 110 to determine the bandwidth utilization event associated with the notification message. For example, the notification message may indicate or otherwise be associated with a particular bandwidth utilization threshold being reached (or crossed) by an increased aggregate downstream load monitored in the network. In such an example, the STB bandwidth adjuster 320 may determine the bandwidth utilization event is a bandwidth reduction event indicating that the vSTB 125 should reduce its output bandwidth, if possible, and the STB bandwidth adjuster 320 may further associate the bandwidth reduction event with a severity based on the particular bandwidth utilization threshold (e.g., a low threshold, a high threshold, etc.) that was reached. As another example, the notification message may indicate or otherwise be associated with a particular bandwidth utilization threshold being reached (or crossed) by a decreased aggregate downstream load monitored in the network. In such an example, the STB bandwidth adjuster 320 may determine the bandwidth utilization event is a bandwidth enhanced event indicating that the vSTB 125 may increase its output bandwidth, if possible, and the STB bandwidth adjuster 320 may further associate the bandwidth enhanced event with a severity based on the particular bandwidth utilization threshold (e.g., a low threshold, a high threshold, etc.) that was reached. In some examples, the received notification message expressly signals the type of bandwidth utilization event (e.g., bandwidth reduction event, bandwidth enhancement event, etc.) and/or the severity associated with the message.

In the illustrated example, the STB bandwidth adjuster 320 provides (e.g., configures) the transcoder 310 with the detected bandwidth utilization event and severity associated with the notification message received from the vAF 110. The transcoder 310 responds to the detected bandwidth utilization event and severity by selecting an appropriate codec for encoding the digital video to be streamed to the pSTB 130. For example, in response to a bandwidth reduction event, the transcoder 310 may switch from its primary codec to its secondary codec or tertiary codec, or from its secondary codec to its tertiary codec, etc., based on the current codec being used by the transcoder 310, the severity of the event and any restrictions caused by the subscriber profile associated with the vSTB 125. As another example, in response to a bandwidth enhancement event, the transcoder 310 may switch from its tertiary codec to its secondary codec or primary codec, or from its secondary codec to its primary codec, etc., based on the current codec being used by the transcoder 310, the severity of the event and any restrictions caused by the subscriber profile associated with the vSTB 125. Further examples of the STB bandwidth adjuster 320 and the transcoder 310 varying the output bandwidth of the vSTB 125 in response to notification messages received from the vAF 110 are illustrated in FIG. 5, which is described in further detail below.

Figure 4:
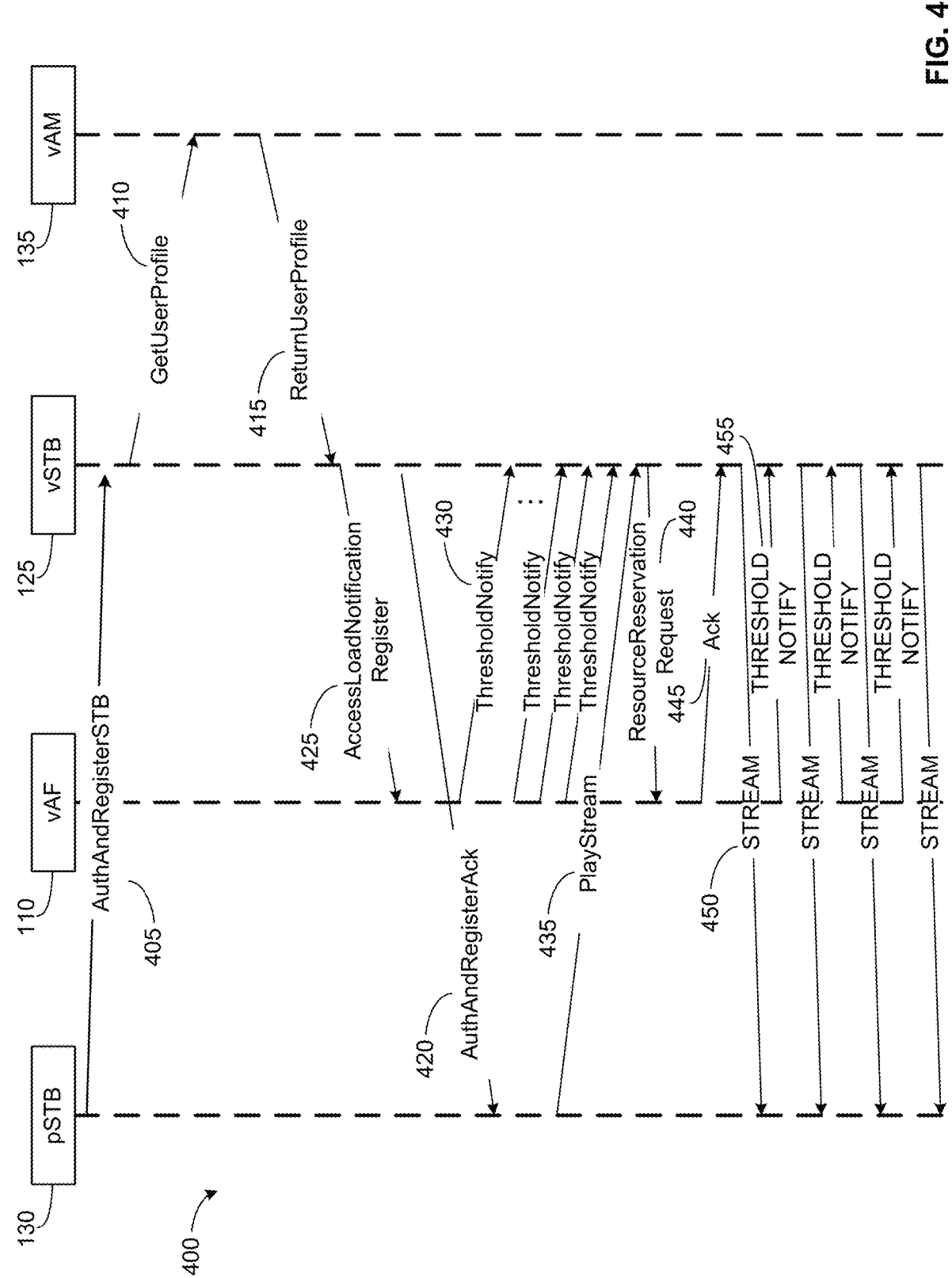
FIG. 4 is an example message sequence diagram illustrating example messages exchanged between elements of the example virtualized communication hub of FIG. 1 to control digital video bandwidth utilization in accordance with the teachings of this disclosure.

An example message sequence diagram 400 illustrating example messages exchanged between elements of the example virtualized communication hub 105 to control digital video bandwidth utilization in accordance with the teachings of this disclosure is illustrated in FIG. 4. With reference to FIGS. 1-3 and their associated descriptions above, the example message sequence diagram 400 begins with the pSTB 130 of a given subscriber 115 sending (e.g., upon startup and/or based on one or more events and/or a schedule) an example authenticate and register message (AuthAndRegisterSTB message) 405 to the communication hum 105 to cause the vSTB 125 associated with the subscriber 115 to be instantiated and started. As disclosed above, the pSTB 130 of the illustrated example of FIG. 4 can be implemented by a subscriber's media presentation device (e.g., a smart television, a personal computer, etc.), one or more devices separate from but communicatively coupled to the subscriber's media presentation device (e.g., such as a set-top box device, a DVR device, a DVD player, a gaming console, etc.), a combination of the subscriber's media presentation device and one or more external devices, etc. The subscriber profile retriever 315 of the vSTB 125 then sends an example get user profile message (GetUserProfile message) 410 to the vAM 135 to request the subscriber profile associated with the vSTB 125 and/or subscriber 115. The subscriber profile retriever 315 of the vSTB 125 receives the requested profile in an example return user profile message (ReturnUserProfile message) 415 returned by the vAM 135 in response to the message 410. The vSTB 125 then sends an example authentication and registration acknowledgment message (AuthAndRegisterAck message 420) back to the pSTB 130 to confirm authentication and registration is complete.

In the illustrated example of FIG. 5, after startup, the STB bandwidth adjuster 320 of the vSTB 125 also sends an example notification registration message (AccessLoadNotificationRegister message) 425 to the vAF 110 to cause the vAF's load event notifier 220 to register the vSTB 125 with the vAF 110 for receiving notification messages transmitted by the vAF 110 when bandwidth utilization events (e.g., bandwidth utilization thresholds being reached by increasing/decreasing aggregate loads) are detected. Subsequently, the STB bandwidth adjuster 320 of the vSTB 125 is able to receive example notification messages (ThresholdNotify messages) 430 from the load event notifier 220 of the vAF 110 indicating or otherwise associated with bandwidth utilization events. In response to the notification messages (ThresholdNotify messages) 430, the STB bandwidth adjuster 320 of the vSTB 125 determines the type and severity of the bandwidth utilization event and configures the transcoder 310 of the vSTB 125 to select an appropriate codec to be used for encoding digital video for streaming to the pSTB 130.

Sometime later, the pSTB 130 sends (e.g., responsive to a user input) a command message (PlayStream message) 435 to the vSTB 125 to begin streaming digital video. In the illustrated example, the STB bandwidth adjuster 320 of the vSTB 125 sends an example resource reservation request message (ResourceReservationRequest message) 440 to the vAF 110 to request reservation of resources (e.g., bandwidth) in the system 100 (e.g., on the broadband access medium 120) to stream its digital video. In some examples, the amount of resources requested in the request message 440 is based on the current codec selected by the transcoder 310 in response to the notification messages 430. The resource registrar 225 of the vAF 110 processes the request message 440 and, possibly after some negotiation between the vAF 110 and vSTB 125, returns an example acknowledgment message (Ack message) 445 acknowledging that the requested resources have been reserved for the vSTB 125. (In some examples, the vSTB 125 will begin streaming, or attempting to stream, the digital video without initially reserving resources by sending the request message 440.)

In the illustrated example of FIG. 5, after receiving the acknowledgment message 445, the vSTB 125 begins streaming its digital video (indicated as STREAM 450 in FIG. 5) encoded using the current codec selected by its transcoder 310. Subsequently, in response to detecting, as described above and in further detail below, occurrences of bandwidth utilization events, the load event notifier 220 of the vAF 110 sends further notification messages (ThresholdNotify messages) 455 to the vSTB 125 indicating or otherwise associated with bandwidth utilization events. In response to a notification message 455, the STB bandwidth adjuster 320 of the vSTB 125 determines the type and severity of the bandwidth utilization events, and configures the transcoder 310 of the vSTB 125 to switch to an appropriate codec, if warranted, to continue encoding the digital video for streaming to the pSTB 130. As illustrated in the example of FIG. 5, the vSTB 125 may continue to adjust its output bandwidth for streaming the digital video 450 (e.g., by switching among available codecs) in response to the notification messages 455, if any, received from the vAF 110.

An example sequence of operations 500 performed by the vAF 110 and vSTB 125 of the virtualized communication hub 105 to vary digital video bandwidth utilization in accordance with the teachings of this disclosure is illustrated in FIG. 5. In the illustrated example of FIG. 5, the vAF 110 detects the occurrences of bandwidth utilization events by comparing monitored aggregate load in the system 100 (e.g., on the broadband access medium 120) to one or more bandwidth utilization thresholds. Furthermore, in the illustrated example of FIG. 5, the vAF 110 and vSTB 125 support two lower bandwidth utilization thresholds, referred to in the figure as Threshold_1H 505 and Threshold_1L 510, and two upper bandwidth utilization thresholds, referred to in the figure as Threshold_2H 515 and Threshold_2L 520, to implement hysteresis when adjusting the output bandwidth of the vSTB 125.

The example operations 500 of FIG. 5 begin with the vSTB 125 initially (e.g., at time T0) streaming digital video encoded with its primary codec (block 525). Later, at time T1, the vAF 110 detects that the monitored aggregate load has increased to reach the threshold Threshold_1H 505. Accordingly, at time T1, the vAF 110 sends a notification message indicating or otherwise corresponding to the threshold Threshold_1H 505 having be reached by an increasing aggregate load, which is received by the vSTB 125. In response to this notification message, the vSTB 125 switches to encoding the streamed digital video with a secondary codec (e.g., a medium bandwidth codec) having a lower output bandwidth than the primary codec (block 530). Later, at time T2, the vAF 110 detects that the monitored aggregate load has increased to reach the threshold Threshold_2H 515, which is higher than the threshold Threshold_1H 505. Accordingly, at time T2, the vAF 110 sends another notification message, which indicates or otherwise corresponds to the threshold Threshold_2H 515 having be reached by an increasing aggregate load, which is received by the vSTB 125. In response to this notification message, the vSTB 125 switches to encoding the streamed digital video with a tertiary codec (e.g., a low bandwidth codec) having a lower output bandwidth than the secondary codec (block 535). Later, at time T3, the vAF 110 detects that the monitored aggregate load has decreased to reach the threshold Threshold_2L 520, which is lower than the threshold Threshold_2H 515 but higher than the threshold Threshold_1H 505. Accordingly, at time T3, the vAF 110 sends another notification message, which indicates or otherwise corresponds to the threshold Threshold_2L 520 having be reached by a decreasing aggregate load, which is received by the vSTB 125. In response to this notification message, the vSTB 125 switches back to encoding the streamed digital video with the secondary codec (block 540).

While an example manner of implementing the example digital video communication system 100 is illustrated in FIGS. 1-5, one or more of the elements, processes and/or devices illustrated in FIGS. 1-5 may be combined, divided, re-arranged, omitted, eliminated and/or implemented in any other way. Further, the example virtualized communication hub 105, the example vAF 110, the example broadband access medium 120, the example vSTB 125, the example pSTB 130, the example vAM 135, the example access point functions 205, the example bandwidth controller 210, the example load monitor 215, the example load event notifier 220, the example resource registrar 225, the example cloud DVR 305, the example transcoder 310, the example subscriber profile retriever 315, the example STB bandwidth adjuster 320 and/or, more generally, the example digital video communication system 100 of FIGS. 1-5 may be implemented by hardware, software, firmware and/or any combination of hardware, software and/or firmware. Thus, for example, any of the example virtualized communication hub 105, the example vAF 110, the example broadband access medium 120, the example vSTB 125, the example pSTB 130, the example vAM 135, the example access point functions 205, the example bandwidth controller 210, the example load monitor 215, the example load event notifier 220, the example resource registrar 225, the example cloud DVR 305, the example transcoder 310, the example subscriber profile retriever 315, the example STB bandwidth adjuster 320 and/or, more generally, the example digital video communication system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example digital video communication system 100, the example virtualized communication hub 105, the example vAF 110, the example broadband access medium 120, the example vSTB 125, the example pSTB 130, the example vAM 135, the example access point functions 205, the example bandwidth controller 210, the example load monitor 215, the example load event notifier 220, the example resource registrar 225, the example cloud DVR 305, the example transcoder 310, the example subscriber profile retriever 315 and/or the example STB bandwidth adjuster 320 is/are hereby expressly defined to be a tangible computer readable storage device or storage disk such as a memory, a digital versatile disk (DVD), a compact disk (CD), a Blu-ray disk, etc. storing the software and/or firmware. Further still, the example digital video communication system 100 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example digital video communication system 100, the example virtualized communication hub 105, the example vAF 110, the example broadband access medium 120, the example vSTB 125, the example pSTB 130, the example vAM 135, the example access point functions 205, the example bandwidth controller 210, the example load monitor 215, the example load event notifier 220, the example resource registrar 225, the example cloud DVR 305, the example transcoder 310, the example subscriber profile retriever 315 and/or the example STB bandwidth adjuster 320 are shown in FIGS. 6-9. In these examples, the machine readable instructions comprise one or more programs for execution by a processor, such as the processor 1012 shown in the example processor platform 1000 discussed below in connection with FIG. 10. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1012, but the entire program or programs and/or portions thereof could alternatively be executed by a device other than the processor 1012 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-9, many other methods of implementing the example digital video communication system 100, the example virtualized communication hub 105, the example vAF 110, the example broadband access medium 120, the example vSTB 125, the example pSTB 130, the example vAM 135, the example access point functions 205, the example bandwidth controller 210, the example load monitor 215, the example load event notifier 220, the example resource registrar 225, the example cloud DVR 305, the example transcoder 310, the example subscriber profile retriever 315 and/or the example STB bandwidth adjuster 320 may alternatively be used. For example, with reference to the flowcharts illustrated in FIGS. 6-9, the order of execution of the blocks may be changed, and/or some of the blocks described may be changed, eliminated, combined and/or subdivided into multiple blocks.

As mentioned above, the example processes of FIGS. 6-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-9 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 6:
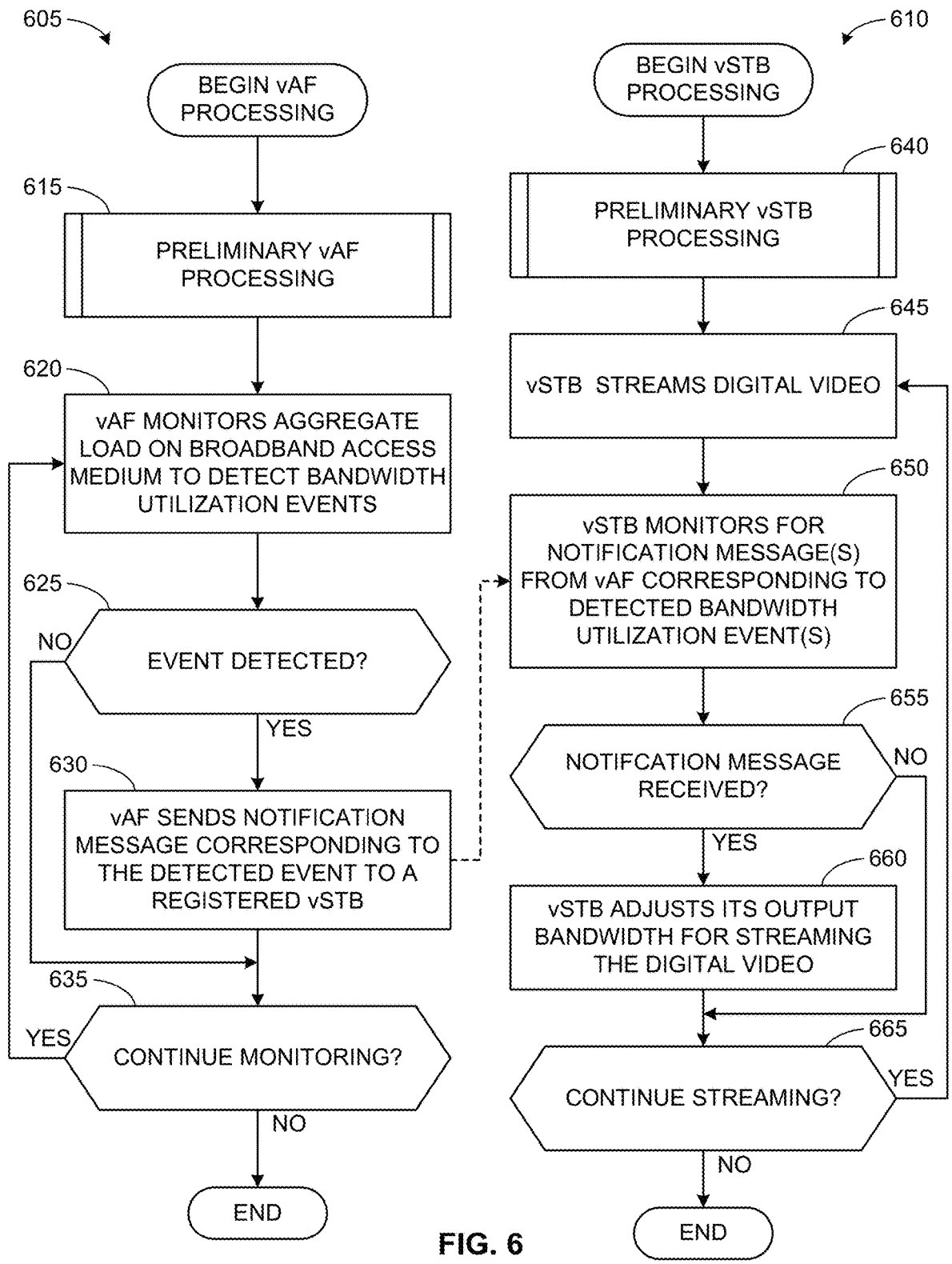
FIGS. 6-7 are flowchart representative of example computer readable instructions that may be executed to implement the example virtual set-top box of FIG. 2 and the example virtual access function of FIG. 3 in the example virtualized communication hub of FIG. 1.
Figure 7:
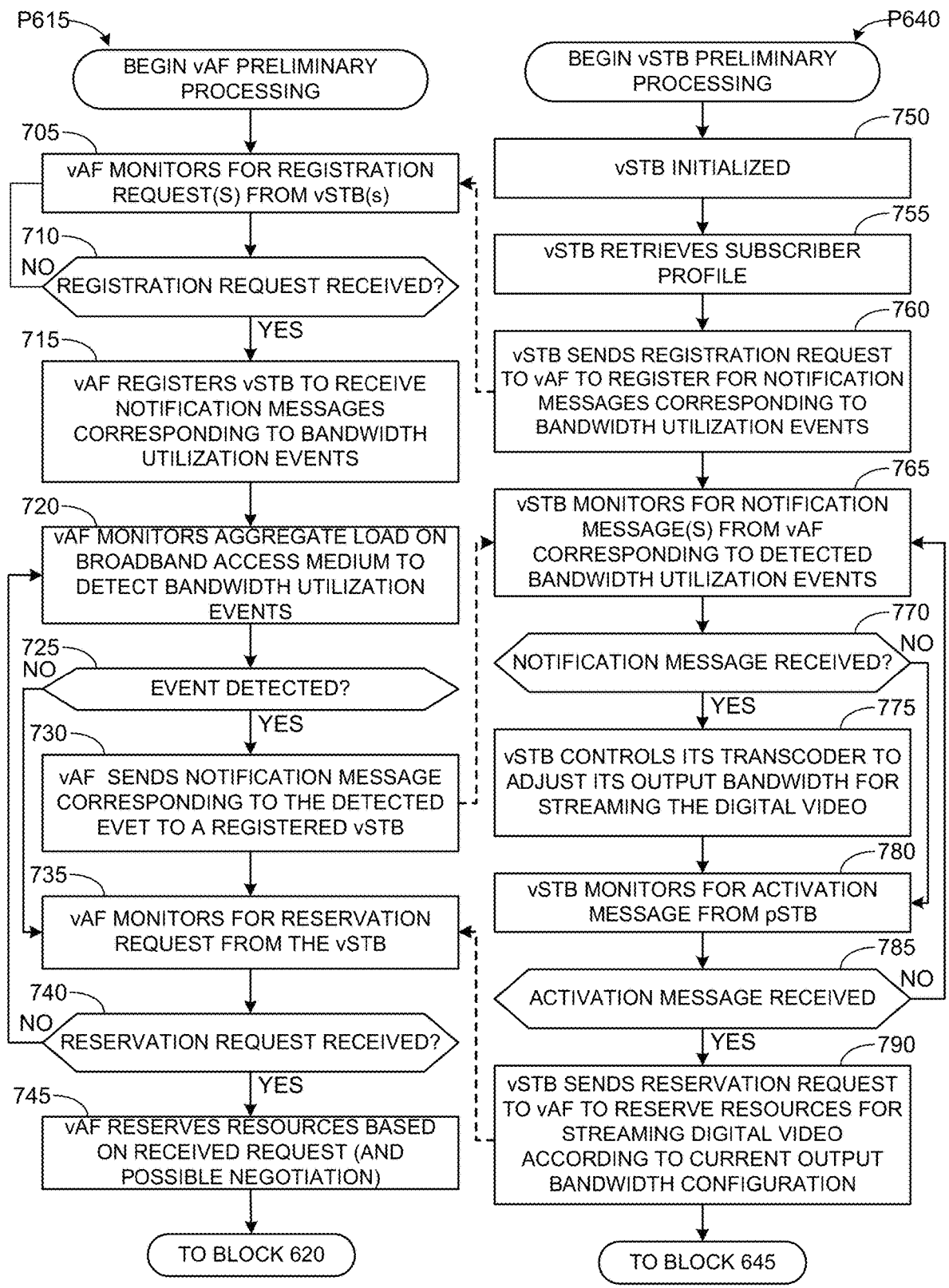

Example programs 605 and 610 that may be executed to implement the example vAF 110 and the example vSTB 125, respectively, of the example virtualized communication hub 105 included in the example digital video communication system 100 of FIGS. 1-5 are represented by the flowcharts shown in FIG. 6. With reference to the preceding figures and associated written descriptions, the example program 605 of FIG. 6, which can implement the example vAF 110, begins execution at block 615 at which the vAF 110 performs preliminary processing related to controlling digital video bandwidth utilization. An example program to perform the processing at block 615 is illustrated in FIG. 7, which is described in further detail below.

After preliminary processing is complete, at block 620, the example load monitor 215 of the example bandwidth controller 210 of the vAF 110 monitors the aggregate downstream load on the broadband access medium 120 of the system 100 (and/or anywhere else in the system 100, such as within the virtualized communication hub 105) to detect bandwidth utilization events, as described above. At block 625, the load monitor 215 determines whether a bandwidth utilization event has been detected. If a bandwidth utilization event is detected (block 625), then at block 630 the example load event notifier 220 of the example bandwidth controller 210 of the vAF 110 sends, as described above, a notification message identifying or otherwise corresponding to the particular detected bandwidth utilization event to a registered vSTB 125. After the notification message is sent (block 630), or if no bandwidth utilization event is detected (block 625), then at block 635 the vAF 110 determines whether to continue aggregate load monitoring. If monitoring is to continue (block 635), the processing returns to block 620 and blocks subsequent thereto. Otherwise, execution of the example program 605 ends.

The example program 610 of FIG. 6, which can implement the example vSTB 125, begins execution at block 640 at which the vSTB 125 performs preliminary processing related to controlling digital video bandwidth utilization. An example program to perform the processing at block 640 is illustrated in FIG. 7, which is described in further detail below. After preliminary processing is complete, at block 645, the example transcoder 310 of the vSTB 125 begins streaming digital video to its associated pSTB 130 (e.g., in response to a user input at the pSTB 130). At block 650, the example STB bandwidth adjuster 320 of the vSTB 125 monitors for notification messages corresponding to bandwidth utilization events detected by the vAF 110. At block 655, the STB bandwidth adjuster 320 determines whether a notification message has been received from the vAF 110. If a notification message is received (block 655), at block 660 the STB bandwidth adjuster 320 adjusts the output bandwidth used by the vSTB 125 for streaming video, as described above. For example, at block 660, the vSTB 125 determines the type and severity of the bandwidth utilization event associated with received notification message, determines the set of available codecs that can be selected for encoding the digital video (e.g., as limited or specified based on a subscriber profile), and then configures the transcoder 310 of the vSTB 125 to switch to an appropriate codec for encoding the digital video, as described above.

After adjusting the output bandwidth of the vSTB 125 (block 660), or if a notification message has not been received, then at block 665 the vSTB 110 determines (e.g., based on the presence or absence of a user input) whether to continue streaming digital video. If streaming is to continue (block 665), the processing returns to block 645 and blocks subsequent thereto. Otherwise, execution of the example program 610 ends Example programs P615 and P640 that may be executed to implement the preliminary processing at blocks 615 and 620, respectfully, of FIG. 6 are represented by the flowcharts shown in FIG. 7. With reference to the preceding figures and associated written descriptions, the example program P615 of FIG. 7, which can implement the example vAF 110, begins execution at block 705 at which the example load event notifier 220 of the example bandwidth controller 210 of the vAF 110 monitors for a notification registration message from a vSTB 125. If a notification registration message is received (block 710), at block 715 the load event notifier 220 of the vAF 110 registers the vSTB 125 to receive notification messages corresponding to bandwidth utilization events, as described above.

At block 720, the example load monitor 215 of the bandwidth controller 210 of the vAF 110 monitors the aggregate downstream load on the broadband access medium 120 of the system 100 (and/or anywhere else in the system 100, such as within the virtualized communication hub 105) to detect bandwidth utilization events, as described above. If a bandwidth utilization event is detected (block 725), then at block 730 the example load event notifier 220 of the example bandwidth controller 210 of the vAF 110 sends, as described above, a notification message identifying or otherwise corresponding to the particular detected bandwidth utilization event to a registered vSTB 125. At block 735, the example resource registrar 225 of the bandwidth controller 210 of the vAF 110 monitors for resource reservation request message from the vSTB 125. If a resource reservation request message is received (block 740), then resource registrar 225 reserves (possibly after a negotiation) resources on the broadband access medium 120 (and/or anywhere else in the system 100, such as within the virtualized communication hub 105) for the vSTB 125 to use for streaming digital audio. Processing then proceeds to block 620 of FIG. 6.

The example program P640 of FIG. 7, which can implement the example vSTB 125, begins execution at block 750 at which the vSTB 125 is initialized (e.g., instantiated and started). At block 755, the example subscriber profile retriever 315 of the vSTB 125 retrieves a subscriber profile from the vAM 135. At block 760, the example STB bandwidth adjuster 320 of the vSTB 125 sends a notification registration message to the vAF 110 to register to receive notification messages corresponding to bandwidth utilization events, as described above. At block 765, the STB bandwidth adjuster 320 of the vSTB 125 monitors for notification messages from the vAF 110 corresponding to bandwidth utilization events, as described above. If a notification message is received (block 770), then at block 775 the STB bandwidth adjuster 320 adjusts the output bandwidth to be used by the vSTB 125 for streaming video, as described above. For example, at block 660, the STB bandwidth adjuster 320 of the vSTB 125 determines the type and severity of the bandwidth utilization event associated with received notification message, determines the set of available codes that can be selected for encoding the digital video (e.g., as limited or specified based on the subscriber profile retrieved at block 755), and then configures the transcoder 310 of the vSTB 125 to select an appropriate code for future encoding of digital video, as described above.

At block 780, the vSTB 125 monitors for control messages received from its corresponding pSTB 130 to, for example, begin streaming digital video. If such a control message is received (block 785), then at block 790 the STB bandwidth adjuster 320 of vSTB 125 sends a resource reservation request message to the vAF 110 to request reservation (possibly after a negotiation) of resources on the broadband access medium 120 (and/or anywhere else in the system 100, such as within the virtualized communication hub 105) for the vSTB 125 to use to start streaming digital audio. Processing then proceeds to block 645 of FIG. 6.

Figure 8:
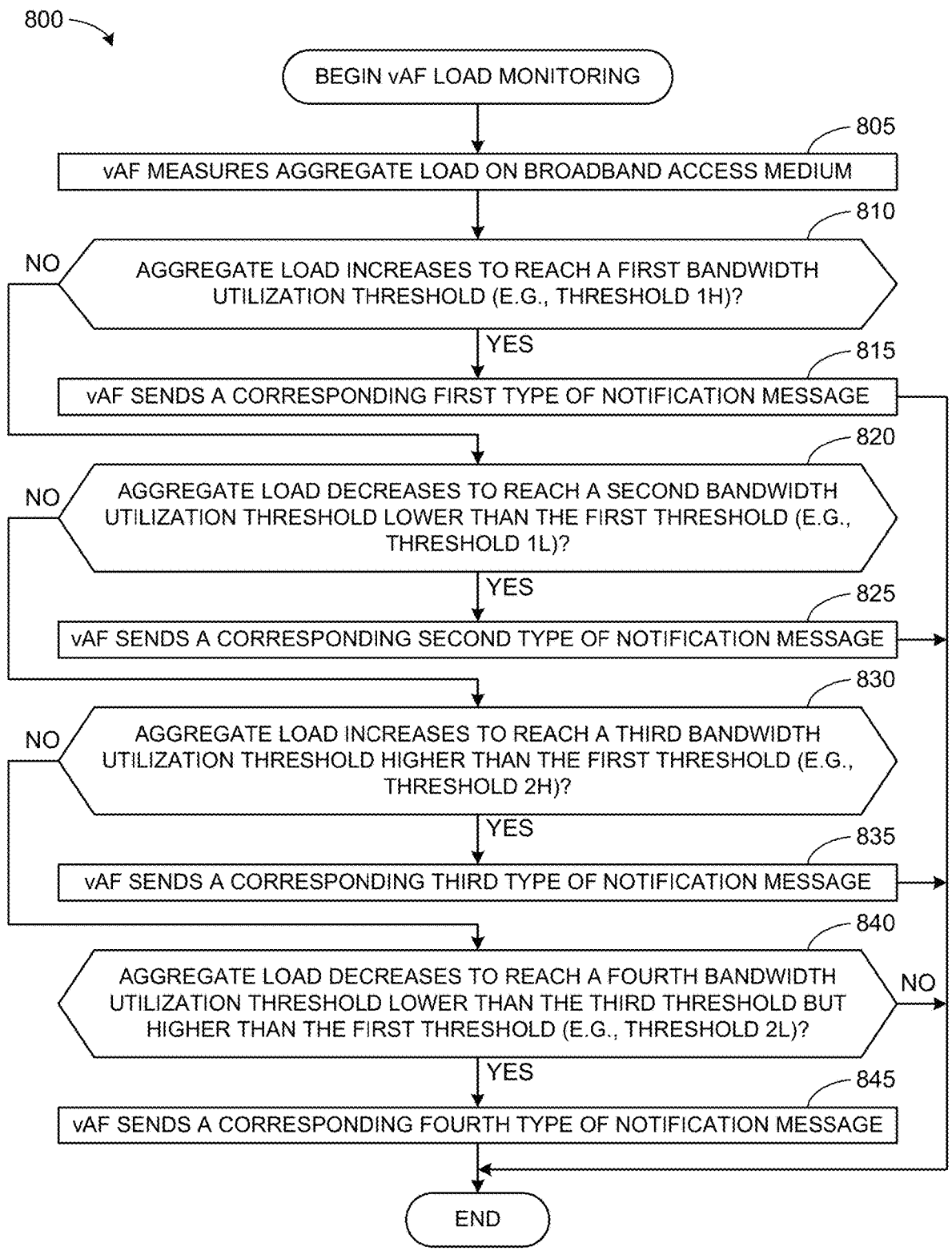
FIG. 8 is a flowchart representative of example computer readable instructions that may be executed to implement load monitoring by the example virtual access function of FIG. 3.

An example program 800 that may be used to implement load monitoring in the example vAF 110 of FIGS. 1-5 is illustrated in FIG. 8. In some examples, the program 800 can be used to implement the processing at block 620-630 of FIG. 6. With reference to the preceding figures and associated written descriptions, the example program 800 of FIG. 8 begins execution at block 805, at which the example load monitor 215 of the example bandwidth controller 210 of the vAF 110 monitors the aggregate downstream load on the broadband access medium 120 (and/or anywhere else in the system 100, such as within the virtualized communication hub 105). At block 810, the load monitor 215 determines whether the aggregate load has increased to reach a first bandwidth utilization threshold, such as the threshold Threshold_1H 505 of FIG. 5. If the aggregate load has increased to reach the first bandwidth utilization threshold (block 810), at block 815 the example load event notifier 220 of the bandwidth controller 210 of the vAF 110 sends a first notification message to indicate that a first type of bandwidth utilization event has been detected. For example, the first notification message may indicate or otherwise represent that a low severity bandwidth utilization event associated with the aggregate downstream load reaching a first threshold has occurred.

However, if the aggregate load has not increased to reach the first bandwidth utilization threshold (block 810), then at block 820 the load monitor 215 determines whether the aggregate load has decreased to reach a second bandwidth utilization threshold lower than the first bandwidth utilization threshold, such as the threshold Threshold_1L 510 of FIG. 5. If the aggregate load has decreased to reach the second bandwidth utilization threshold (block 820), at block 825 the example load event notifier 220 sends a second notification message to indicate that a second type of bandwidth utilization event has been detected. For example, the second notification message may indicate or otherwise represent that a low severity bandwidth utilization event associated with the aggregate downstream load decreasing below a second threshold has occurred.

However, if the aggregate load has not decreased to reach the second bandwidth utilization threshold (block 820), then at block 830 the load monitor 215 determines whether the aggregate load has increased to reach a third bandwidth utilization threshold higher than the first bandwidth utilization threshold, such as the threshold Threshold_2H 515 of FIG. 5. If the aggregate load has increased to reach the third bandwidth utilization threshold (block 830), at block 835 the example load event notifier 220 sends a third notification message to indicate that a third type of bandwidth utilization event has been detected. For example, the third notification message may indicate or otherwise represent that a high severity bandwidth utilization event associated with the aggregate downstream load increasing above a third threshold has occurred.

However, if the aggregate load has not increased to reach the third bandwidth utilization threshold (block 830), then at block 840 the load monitor 215 determines whether the aggregate load has decreased to reach a fourth bandwidth utilization threshold lower than the third bandwidth utilization threshold but higher than the first bandwidth utilization threshold, such as the threshold Threshold_2L 520 of FIG. 5. If the aggregate load has decreased to reach the fourth bandwidth utilization threshold (block 840), at block 845 the example load event notifier 220 sends a fourth notification message to indicate that a fourth type of bandwidth utilization event has been detected. For example, the fourth notification message may indicate or otherwise represent that a high severity bandwidth utilization event associated with the aggregate downstream load decreasing below a fourth threshold has occurred. Execution of the example program 800 then ends.

Figure 9:
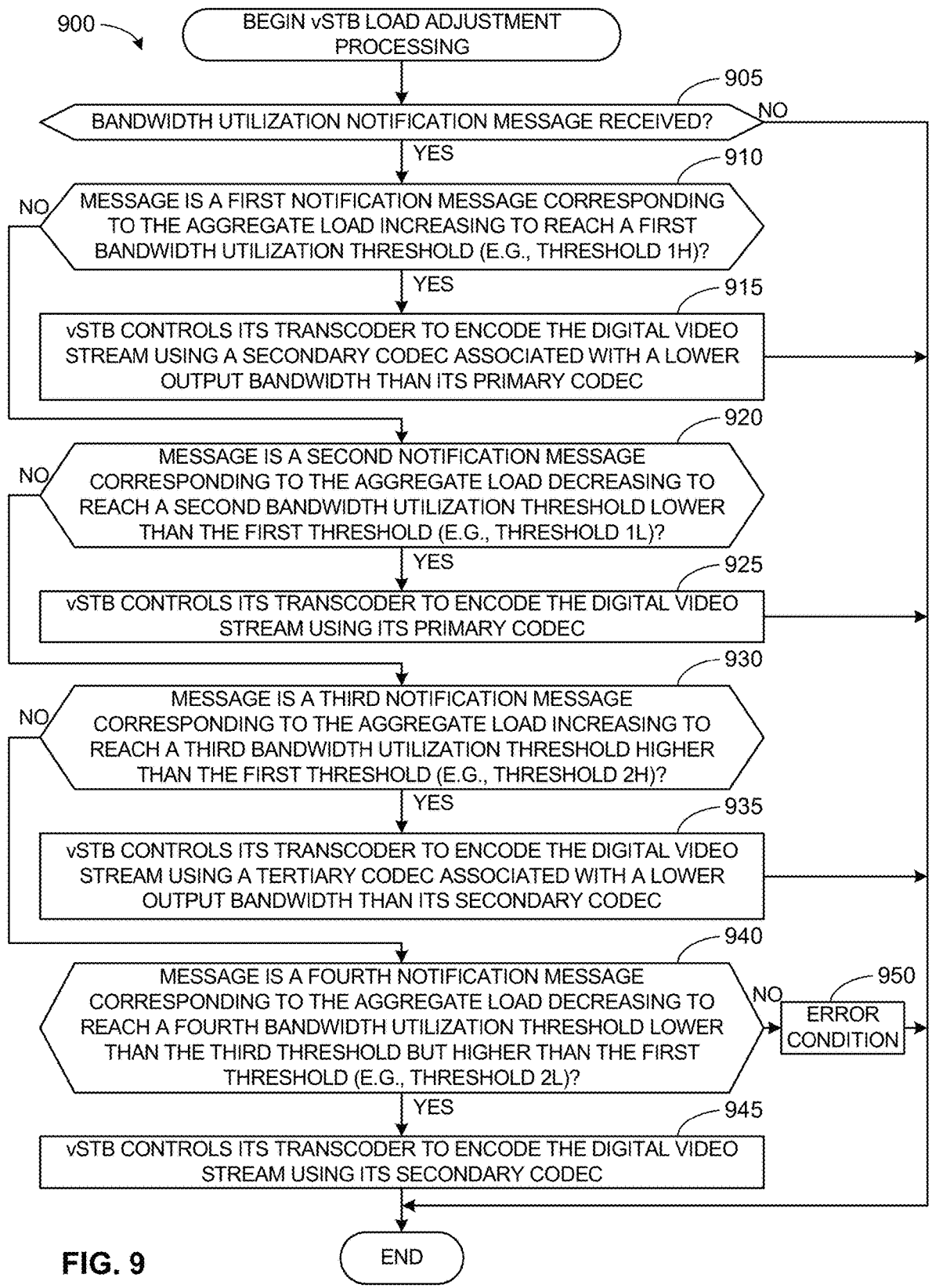
FIG. 9 is a flowchart representative of example computer readable instructions that may be executed to implement bandwidth adjustment processing by the example virtual set-top box of FIG. 2.

An example program 900 that may be used to implement load adjustment processing in the example vSTB 125 of FIGS. 1-5 is illustrated in FIG. 9. In some examples, the program 900 can be used to implement the processing at block 655-660 of FIG. 6. With reference to the preceding figures and associated written descriptions, the example program 900 of FIG. 9 begins execution at block 905, at which the example STB bandwidth adjuster 320 of the vSTB 125 monitors for notification messages sent by the vAF 110. At block 910, the STB bandwidth adjuster 320 determines whether a first notification message indicating occurrence of a low severity bandwidth utilization event corresponding to monitored aggregate load increasing to reach a first bandwidth utilization threshold, such as the threshold Threshold_1H 505 of FIG. 5, has been received. If such a first notification message is received (block 910), then at block 915 the STB bandwidth adjuster 320 controls, as described above, the example transcoder 310 of the vSTB 125 to encode digital video for streaming using a secondary codec associated with a lower output bandwidth than the vSTB's primary codec.

However, if such a first notification message is not received (block 910), at block 920 the STB bandwidth adjuster 320 determines whether a second notification message indicating occurrence of a low severity bandwidth utilization event corresponding to monitored aggregate load decreasing to reach a second bandwidth utilization threshold, such as the threshold Threshold_1L 510 of FIG. 5, has been received. If such a second notification message is received (block 920), then at block 925 the STB bandwidth adjuster 320 controls, as described above, the example transcoder 310 of the vSTB 125 to encode digital video for streaming using the vSTB's primary codec.

However, if such a second notification message is not received (block 920), at block 930 the STB bandwidth adjuster 320 determines whether a third notification message indicating occurrence of a high severity bandwidth utilization event corresponding to monitored aggregate load increasing to reach a third bandwidth utilization threshold, such as the threshold Threshold_1H 515 of FIG. 5, has been received. If such a third notification message is received (block 930), then at block 935 the STB bandwidth adjuster 320 controls, as described above, the example transcoder 310 of the vSTB 125 to encode digital video for streaming using a tertiary codec associated with a lower output bandwidth than the vSTB's secondary codec.

However, if such a third notification message is not received (block 930), at block 940 the STB bandwidth adjuster 320 determines whether a fourth notification message indicating occurrence of a high severity bandwidth utilization event corresponding to monitored aggregate load decreasing to reach a fourth bandwidth utilization threshold, such as the threshold Threshold_1L 520 of FIG. 5, has been received. If such a fourth notification message is received (block 940), then at block 945 the STB bandwidth adjuster 320 controls, as described above, the example transcoder 310 of the vSTB 125 to encode digital video for streaming using the vSTB's secondary codec. In the illustrated example of FIG. 9, is such a fourth notification message is not received (block 930), at block 950, the vSTB 125 indicates that an error condition has occurred. Execution of the example program 900 then ends.

Figure 10:
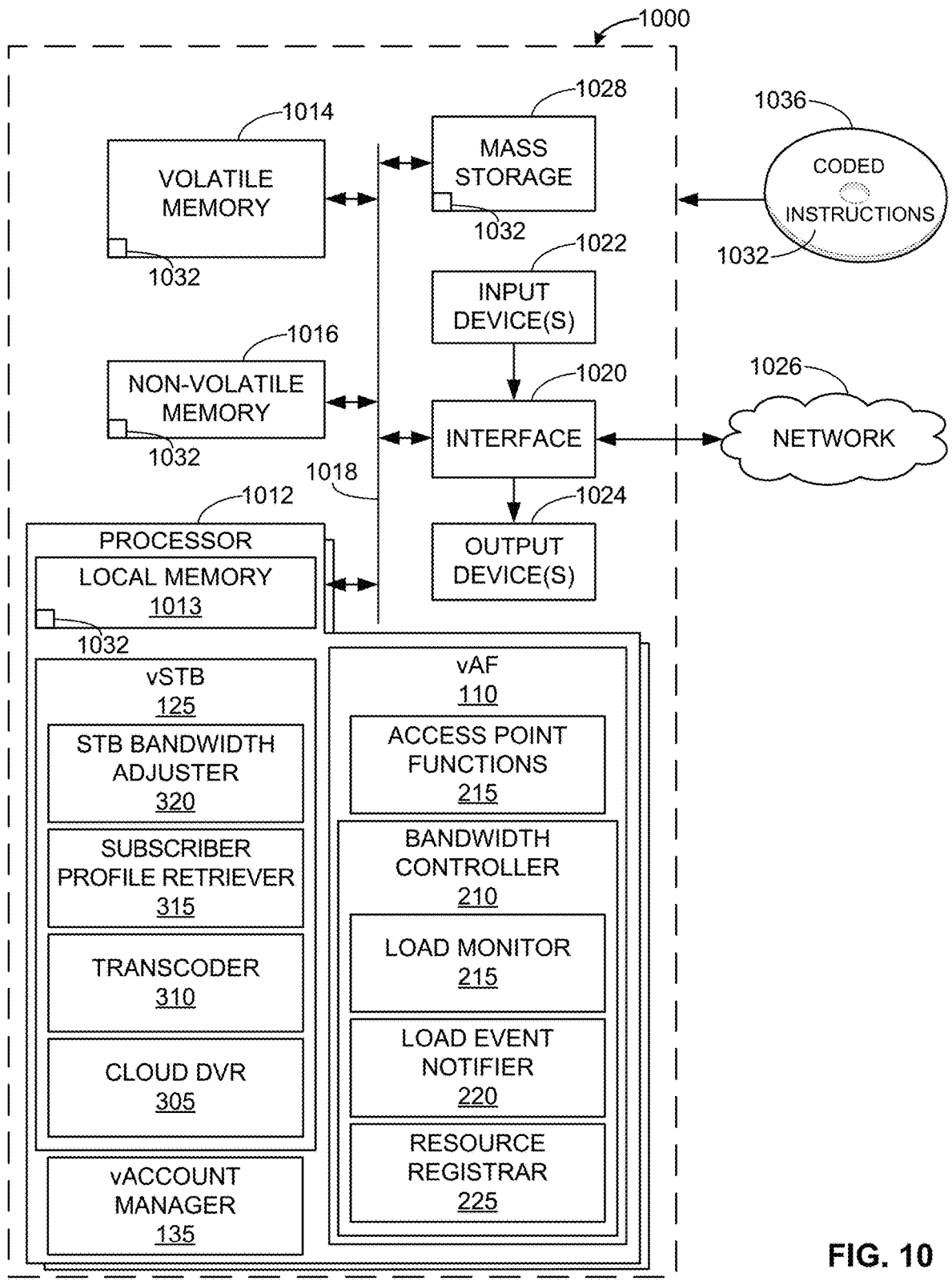
FIG. 10 is a block diagram of an example processor platform structured to execute the example computer readable instructions of FIGS. 6-8 and/or 9 to implement the example virtualized communication hub of FIGS. 1-5.

FIG. 10 is a block diagram of an example processor platform 1000 structured to execute the instructions of FIGS. 6-9 to implement the example virtualized communication hub 105 of the example digital video communication system 100 of FIGS. 1-5. The processor platform 1000 can correspond to, for example, one or more servers of a cloud computing data center, and/or any other type of computing device or devices.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 11, the processor 1012 is configured via example instructions 1032, which include one or more the example instructions of FIGS. 6-9, to implement at least the example virtualized communication hub 105, the example vAF 110, the example vSTB 125, the example bandwidth controller 210, the example load monitor 215, the example load event notifier 220, the example resource registrar 225, the example cloud DVR 305, the example transcoder 310, the example subscriber profile retriever 315 and the example STB bandwidth adjuster 320 of FIGS. 1-5.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and digital versatile disk (DVD) drives.

Coded instructions 1032 corresponding to the instructions of FIGS. 6-9 may be stored in the mass storage device 1028, in the volatile memory 1014, in the non-volatile memory 1016, in the local memory 1013 and/or on a removable tangible computer readable storage medium, such as a CD or DVD 1036.

The foregoing disclosure provides examples of controlling digital video bandwidth utilization with a virtualized communication hub implemented by a server cluster in a digital video communication system (e.g., a broadband service provider network). The following further examples, which include subject matter such as a method to control digital video bandwidth utilization with a virtualized communication hub implemented by a server cluster, means for controlling digital video bandwidth utilization with a virtualized communication hub implemented by a server cluster, at least one computer-readable storage medium including instructions that, when executed by a processor, cause the processor to control digital video bandwidth utilization with a virtualized communication hub, and a virtualized communication hub implemented by a server cluster to control digital video bandwidth utilization are disclosed herein. The disclosed examples can be implemented individually and/or in one or more combinations.

Example 1 is a virtualized communication hub implemented by a server cluster. The virtualized communication hub of example 1 includes a virtual set-top box to stream digital media to a physical set-top box via a broadband access medium. The virtualized communication hub of example 1 also includes virtual access function to monitor an aggregate load on the broadband access medium to detect bandwidth utilization events, and send a first notification message to the virtual set-top box in response to detecting a first bandwidth utilization event, the virtual set-top box to adjust an output bandwidth for streaming the digital media based on the first notification message.

Example 2 includes the subject matter of example 1, wherein the virtual access function is to register the virtual set-top box to receive notification messages prior to the first notification message being sent, the virtual access function to register the virtual set-top box in response to an access request message received from the virtual set-top box.

Example 3 includes the subject matter of example 1 or example 2, wherein the virtual access function is to reserve resources of the broadband access medium for use by the virtual set-top box to stream the digital media in response to a reservation request received from the virtual set-top box after the first notification message being sent.

Example 4 includes the subject matter of example 3, wherein, in response to detecting a second bandwidth utilization event, the virtual access function is to adjust the resources of the broadband access medium reserved for use by the virtual set-top box to stream the digital media, and send a second notification message to the virtual set-top box, the virtual set-top box to further adjust the output bandwidth for streaming the digital media based on the second notification message.

Example 5 includes the subject matter of any one of examples 1 to 4, wherein the virtual set-top box is to adjust the output bandwidth for streaming the digital media based on the first notification message and a profile of a subscriber associated with the virtual set-top box.

Example 6 includes the subject matter of any one of examples 1 to 5, wherein to monitor the aggregate load, the virtual access function is to compare the monitored aggregate load to a first bandwidth utilization threshold, and detect the first bandwidth utilization event when the monitored aggregate load increases to reach the first bandwidth utilization threshold, the first bandwidth utilization event associated with the monitored aggregate load having reached the first bandwidth utilization threshold.

Example 7 includes the subject matter of example 6, wherein the first notification message indicates the monitored aggregate load has reached the first bandwidth utilization threshold, and in response to receiving the first notification message, the virtual set-top box is to control a transcoder of the virtual set-top box to encode a data stream for streaming the digital video with a secondary codec associated with a lower bandwidth than a primary codec of the virtual set-top box to reduce the output bandwidth for streaming the digital media.

Example 8 includes the subject matter of example 7, wherein to monitor the aggregate load, the virtual access function is further to compare the monitored aggregate load to a second bandwidth utilization threshold lower than the first bandwidth utilization threshold, and detect a second bandwidth utilization event when the monitored aggregate load decreases to reach the second bandwidth utilization threshold, the second bandwidth utilization event associated with the monitored aggregate load having reached the second bandwidth utilization threshold.

Example 9 includes the subject matter of example 8, wherein in response to detecting the second bandwidth utilization event, the virtual access function is to send a second notification message to the virtual set-top box, the second notification message indicating the monitored aggregate load has reached the second bandwidth utilization threshold, and in response to receiving the second notification message, the virtual set-top box is to control the transcoder to switch from the secondary codec to the primary codec to encode the data stream for streaming the digital media.

Example 10 includes the subject matter of example 9, wherein to monitor the aggregate load, the virtual access function is further to compare the monitored aggregate load to a third bandwidth utilization threshold higher than the first bandwidth utilization threshold, and detect a third bandwidth utilization event when the monitored aggregate load increases to reach the third bandwidth utilization threshold, the third bandwidth utilization event associated with the monitored aggregate load having reached the third bandwidth utilization threshold.

Example 11 includes the subject matter of example 10, wherein in response to detecting the third bandwidth utilization event, the virtual access function is to send a third notification message to the virtual set-top box, the third notification message indicating the monitored aggregate load has reached the third bandwidth utilization threshold, and in response to receiving the third notification message, the virtual set-top box is to control the transcoder to encode the data stream for streaming the digital media with a tertiary codec associated with a lower bandwidth than the secondary codec to further reduce the output bandwidth for streaming the digital media.

Example 12 includes the subject matter of example 11, wherein to monitor the aggregate load, the virtual access function is further to compare the monitored aggregate load to a fourth bandwidth utilization threshold lower than the third bandwidth utilization threshold but higher than the first bandwidth utilization threshold, and detect a fourth bandwidth utilization event when the monitored aggregate load decreases to reach the fourth bandwidth utilization threshold, the fourth bandwidth utilization event associated with the monitored aggregate load having reached the fourth bandwidth utilization threshold.

Example 13 includes the subject matter of example 12, wherein in response to detecting the fourth bandwidth utilization event, the virtual access function is to send a fourth notification message to the virtual set-top box, the fourth notification message indicating the monitored aggregate load has reached the fourth bandwidth utilization threshold, and in response to receiving the fourth notification message, the virtual set-top box is to control the transcoder to switch from the tertiary codec to the secondary codec to encode the data stream for streaming the digital media.

Example 14 is a method to control digital video bandwidth utilization with a virtualized communication hub implemented by a server cluster. The method of example 14 includes monitoring, with a virtual access function of the virtualized communication hub, an aggregate load on a broadband access medium to detect bandwidth utilization events. The method of example 14 also includes sending, from the virtual access function, a first notification message to a virtual set-top box of the virtualized communication hub in response to detecting a first bandwidth utilization event. The method of example 14 further includes adjusting, at the virtual set-top box and based on the first notification message, an output bandwidth for streaming digital media from the virtual set-top box to a physical set-top box via a broadband access medium.

Example 15 includes the subject matter of example 14, and further includes, in response to an access request message received by the virtual access function from the virtual set-top box prior to the first notification message being sent, registering the virtual set-top box with the virtual access function to permit the virtual set-top box to receive notification messages.

Example 16 includes the subject matter of example 14 or example 15, and further includes reserving resources of the broadband access medium for use by the virtual set-top box to stream the digital media in response to a reservation request received from the virtual set-top box after the first notification message being sent.

Example 17 includes the subject matter of example 16, and further includes, in response to detecting a second bandwidth utilization event, adjusting the resources of the broadband access medium reserved for use by the virtual set-top box to stream the digital media, and sending a second notification message from the virtual access function to the virtual set-top box, the virtual set-top box to further adjust the output bandwidth for streaming the digital media based on the second notification message.

Example 18 includes the subject matter of any one of examples 14 to 17, wherein the virtual set-top box is to adjust the output bandwidth for streaming the digital media based on the first notification message and a profile of a subscriber associated with the virtual set-top box.

Example 19 includes the subject matter of any one of examples 14 to 18, wherein the monitoring of the aggregate load includes comparing the monitored aggregate load to a first bandwidth utilization threshold, and detecting the first bandwidth utilization event when the monitored aggregate load increases to reach the first bandwidth utilization threshold, the first bandwidth utilization event associated with the monitored aggregate load having reached the first bandwidth utilization threshold.

Example 20 includes the subject matter of example 19, wherein the first notification message indicates the monitored aggregate load has reached the first bandwidth utilization threshold, and the adjusting of the output bandwidth includes controlling a transcoder of the virtual set-top box to encode a data stream for streaming the digital video with a secondary codec associated with a lower bandwidth than a primary codec of the virtual set-top box to reduce the output bandwidth for streaming the digital media.

Example 21 includes the subject matter of example 20, wherein the monitoring of the aggregate load further includes comparing the monitored aggregate load to a second bandwidth utilization threshold lower than the first bandwidth utilization threshold, and detecting a second bandwidth utilization event when the monitored aggregate load decreases to reach the second bandwidth utilization threshold, the second bandwidth utilization event associated with the monitored aggregate load having reached the second bandwidth utilization threshold.

Example 22 includes the subject matter of example 21, and further includes, in response to detecting the second bandwidth utilization event, sending a second notification message from the virtual access function to the virtual set-top box, the second notification message indicating the monitored aggregate load has reached the second bandwidth utilization threshold, and controlling, at the virtual set-top box in response to receiving the second notification message, the transcoder to switch from the secondary codec to the primary codec to encode the data stream for streaming the digital media.

Example 23 includes the subject matter of example 22, wherein the monitoring of the aggregate load further includes comparing the monitored aggregate load to a third bandwidth utilization threshold higher than the first bandwidth utilization threshold, and detecting a third bandwidth utilization event when the monitored aggregate load increases to reach the third bandwidth utilization threshold, the third bandwidth utilization event associated with the monitored aggregate load having reached the third bandwidth utilization threshold.

Example 24 includes the subject matter of example 23, and further includes, in response to detecting the third bandwidth utilization event, sending a third notification message from the virtual access function to the virtual set-top box, the third notification message indicating the monitored aggregate load has reached the third bandwidth utilization threshold, and controlling, at the virtual set-top box in response to receiving the third notification message, the transcoder to encode the data stream for streaming the digital media with a tertiary codec associated with a lower bandwidth than the secondary codec to further reduce the output bandwidth for streaming the digital media.

Example 25 includes the subject matter of example 24, wherein the monitoring of the aggregate load further includes comparing the monitored aggregate load to a fourth bandwidth utilization threshold lower than the third bandwidth utilization threshold but higher than the first bandwidth utilization threshold, and detecting a fourth bandwidth utilization event when the monitored aggregate load decreases to reach the fourth bandwidth utilization threshold, the fourth bandwidth utilization event associated with the monitored aggregate load having reached the fourth bandwidth utilization threshold.

Example 26 includes the subject matter of example 25, and further includes, in response to detecting the fourth bandwidth utilization event, sending a fourth notification message from the virtual access function to the virtual set-top box, the fourth notification message indicating the monitored aggregate load has reached the fourth bandwidth utilization threshold, and controlling, at the virtual set-top box in response to receiving the fourth notification message, the transcoder to switch from the tertiary codec to the secondary codec to encode the data stream for streaming the digital media.

Example 27 is a tangible computer readable storage medium including computer readable instructions which, when executed, cause one or more processors of a server cluster to at least (i) monitor, with a virtual access function of a virtualized communication hub implemented by the server cluster, an aggregate load on a broadband access medium to detect bandwidth utilization events, (ii) send, from the virtual access function, a first notification message to a virtual set-top box of the virtualized communication hub in response to detecting a first bandwidth utilization event, and (iii) adjust, at the virtual set-top box and based on the first notification message, an output bandwidth for streaming digital media from the virtual set-top box to a physical set-top box via a broadband access medium.

Example 28 includes the subject matter of example 27, wherein the computer readable instructions, when executed, further cause the one or more processors to register, in response to an access request message received by the virtual access function from the virtual set-top box prior to the first notification message being sent, the virtual set-top box with the virtual access function to permit the virtual set-top box to receive notification messages.

Example 29 includes the subject matter of example 27 or example 28, wherein the computer readable instructions, when executed, further cause the one or more processors to reserve resources of the broadband access medium for use by the virtual set-top box to stream the digital media in response to a reservation request received from the virtual set-top box after the first notification message being sent.

Example 30 includes the subject matter of example 29, wherein, in response to detecting a second bandwidth utilization event, the computer readable instructions, when executed, further cause the one or more processors to adjust the resources of the broadband access medium reserved for use by the virtual set-top box to stream the digital media, and send a second notification message from the virtual access function to the virtual set-top box to cause adjustment of the output bandwidth for streaming the digital media.

Example 31 includes the subject matter of any one of examples 27 to 30, wherein the computer readable instructions, when executed, further cause the one or more processors to adjust the output bandwidth for streaming the digital media based on the first notification message and a profile of a subscriber associated with the virtual set-top box.

Example 32 includes the subject matter of any one of examples 27 to 31, wherein the computer readable instructions, when executed, cause the one or more processors to monitor the aggregate load by: (i) comparing the monitored aggregate load to a plurality of bandwidth utilization threshold; (ii) detecting the first bandwidth utilization event when the monitored aggregate load increases to reach the first bandwidth utilization threshold, the first bandwidth utilization event associated with the monitored aggregate load having reached the first bandwidth utilization threshold; (iii) detecting a second bandwidth utilization event when the monitored aggregate load decreases to reach a second bandwidth utilization threshold lower than the first bandwidth utilization threshold, the second bandwidth utilization event associated with the monitored aggregate load having reached the second bandwidth utilization threshold; (iv) detecting a third bandwidth utilization event when the monitored aggregate load increases to reach the third bandwidth utilization threshold higher than the first bandwidth utilization threshold, the third bandwidth utilization event associated with the monitored aggregate load having reached the third bandwidth utilization threshold; and (v) detecting a fourth bandwidth utilization event when the monitored aggregate load decreases to reach the fourth bandwidth utilization threshold lower than the third bandwidth utilization threshold but higher than the first bandwidth utilization threshold, the fourth bandwidth utilization event associated with the monitored aggregate load having reached the fourth bandwidth utilization threshold.

Example 33 includes the subject matter of example 32, wherein the first notification message indicates the monitored aggregate load has reached the first bandwidth utilization threshold, the computer readable instructions, when executed, cause the processor to adjust the output bandwidth by controlling a transcoder of the virtual set-top box to encode a data stream for streaming the digital video with a secondary codec associated with a lower bandwidth than a primary codec of the virtual set-top box to reduce the output bandwidth for streaming the digital media, and the computer readable instructions, when executed, further cause the processor to: (i) in response to detecting the second bandwidth utilization event, (a) send a second notification message from the virtual access function to the virtual set-top box, the second notification message indicating the monitored aggregate load has reached the second bandwidth utilization threshold, and (b) control the transcoder to switch from the secondary codec to the primary codec to encode the data stream for streaming the digital media; (ii) in response to detecting the third bandwidth utilization event, (c) send a third notification message from the virtual access function to the virtual set-top box, the third notification message indicating the monitored aggregate load has reached the third bandwidth utilization threshold, and (d) control the transcoder to encode the data stream for streaming the digital media with a tertiary codec associated with a lower bandwidth than the secondary codec to further reduce the output bandwidth for streaming the digital media; and (iii) in response to detecting the third bandwidth utilization event, (e) send a fourth notification message from the virtual access function to the virtual set-top box, the fourth notification message indicating the monitored aggregate load has reached the fourth bandwidth utilization threshold, and (f) control the transcoder to switch from the tertiary codec to the secondary codec to encode the data stream for streaming the digital media.

Example 34 is a digital video communication system including a physical set-top box associated with a subscriber location, and a virtualized communication hub implemented by a server cluster. The virtualized communication hub of example 34 includes a virtual set-top box to stream digital media to the physical set-top box via a broadband access medium, means for monitoring an aggregate load on the broadband access medium to detect bandwidth utilization events, and means for sending a first notification message to the virtual set-top box in response to detecting a first bandwidth utilization event, the virtual set-top box to adjust an output bandwidth for streaming the digital media based on the first notification message.

Example 35 includes the subject matter of example 34, and further includes means for registering, in response to an access request message received from the virtual set-top box, the virtual set-top box to receive notification messages prior to the first notification message being sent.

Example 36 includes the subject matter of example 34 or example 35, and further includes means for reserving resources of the broadband access medium for use by the virtual set-top box to stream the digital media in response to a reservation request received from the virtual set-top box after the first notification message being sent.

Example 37 includes the subject matter of example 36, and further includes means for responding to detection of a second bandwidth utilization event by adjusting the resources of the broadband access medium reserved for use by the virtual set-top box to stream the digital media, and sending a second notification message to the virtual set-top box, the virtual set-top box to further adjust the output bandwidth for streaming the digital media based on the second notification message.

Example 38 includes the subject matter of any one of examples 34 to 37, wherein the virtual set-top box is to adjust the output bandwidth for streaming the digital media based on the first notification message and a profile of a subscriber associated with the virtual set-top box.

Example 39 includes the subject matter of any one of examples 34 to 38, wherein the means for monitoring includes: (i) means for comparing the monitored aggregate load to a plurality of bandwidth utilization threshold; (ii) means for detecting the first bandwidth utilization event when the monitored aggregate load increases to reach the first bandwidth utilization threshold, the first bandwidth utilization event associated with the monitored aggregate load having reached the first bandwidth utilization threshold; (iii) means for detecting a second bandwidth utilization event when the monitored aggregate load decreases to reach a second bandwidth utilization threshold lower than the first bandwidth utilization threshold, the second bandwidth utilization event associated with the monitored aggregate load having reached the second bandwidth utilization threshold; (iv) means for detecting a third bandwidth utilization event when the monitored aggregate load increases to reach the third bandwidth utilization threshold higher than the first bandwidth utilization threshold, the third bandwidth utilization event associated with the monitored aggregate load having reached the third bandwidth utilization threshold; and (v) means for detecting a fourth bandwidth utilization event when the monitored aggregate load decreases to reach the fourth bandwidth utilization threshold lower than the third bandwidth utilization threshold but higher than the first bandwidth utilization threshold, the fourth bandwidth utilization event associated with the monitored aggregate load having reached the fourth bandwidth utilization threshold.

Example 40 includes the subject matter of example 39, wherein the first notification message indicates the monitored aggregate load has reached the first bandwidth utilization threshold, and further includes: (i) means for adjusting the output bandwidth by controlling a transcoder of the virtual set-top box to encode a data stream for streaming the digital video with a secondary codec associated with a lower bandwidth than a primary codec of the virtual set-top box to reduce the output bandwidth for streaming the digital media; (ii) means, responsive to detecting the second bandwidth utilization event, for (a) sending a second notification message from the virtual access function to the virtual set-top box, the second notification message indicating the monitored aggregate load has reached the second bandwidth utilization threshold, and (b) controlling the transcoder to switch from the secondary codec to the primary codec to encode the data stream for streaming the digital media; (iii) means, responsive to detecting the third bandwidth utilization event, for (c) sending a third notification message from the virtual access function to the virtual set-top box, the third notification message indicating the monitored aggregate load has reached the third bandwidth utilization threshold, and (d) controlling the transcoder to encode the data stream for streaming the digital media with a tertiary codec associated with a lower bandwidth than the secondary codec to further reduce the output bandwidth for streaming the digital media; and (iv) means, in response to detecting the third bandwidth utilization event, for (e) sending a fourth notification message from the virtual access function to the virtual set-top box, the fourth notification message indicating the monitored aggregate load has reached the fourth bandwidth utilization threshold, and (f) controlling the transcoder to switch from the tertiary codec to the secondary codec to encode the data stream for streaming the digital media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A virtualized communication hub implemented by a server cluster, the virtualized communication hub comprising:

a virtual set-top box structured to stream digital media to a physical set-top box via a broadband access medium, the virtual set-top box including a first codec associated with a first output bandwidth, a second codec associated with a second output bandwidth lower than the first output bandwidth, and a third codec associated with a third output bandwidth lower than the second output bandwidth; and a virtual access function structured to:
monitor an aggregate load on the broadband access medium to detect bandwidth utilization events, a first bandwidth utilization event associated with (i) an event type from among at least two possible event types and (ii) a severity from among at least two possible severity levels;
send a first notification message to the virtual set-top box in response to detecting the first bandwidth utilization event, the first notification message including (i) the event type and (ii) the severity associated with the first bandwidth utilization event; and
reserve bandwidth of the broadband access medium for use by the virtual set-top box to stream the digital media, the virtual access function structured to reserve the bandwidth of the broadband access medium in response to a reservation request from the virtual set-top box after the first notification message is sent, the virtual set-top box structured to:
stream the digital media with the first codec associated with the first output bandwidth;
process the first notification message to determine the event type and the severity associated with the first bandwidth utilization event; and
in response to a determination that the event type corresponds to a bandwidth reduction event, switch from the first codec to one of the second codec or the third codec based on the severity associated with the first bandwidth utilization event, the virtual set-top box structured to switch from the first codec to the second codec to stream the digital media with the second output bandwidth associated with the second codec in response to the severity corresponding to a first severity level, the virtual set-top box structured to switch from the first codec to the third codec to stream the digital media with the third output bandwidth associated with the third codec in response to the severity corresponding to a second severity level, at least one of the virtual set-top box or the virtual access function implemented by one or more of hardware or on at least one processor.

2. The virtualized communication hub of claim 1, wherein the virtual access function is to register the virtual set-top box to receive notification messages prior to the first notification message being sent, the virtual access function to register the virtual set-top box in response to an access request message from the virtual set-top box.

3. The virtualized communication hub of claim 1, wherein, in response to a second bandwidth utilization event, the virtual access function is to:
adjust the bandwidth of the broadband access medium reserved for use by the virtual set-top box to stream the digital media; and
send a second notification message to the virtual set-top box, the virtual set-top box to further adjust an output bandwidth of the virtual set-top box to stream the digital media based on the second notification message.

4. The virtualized communication hub of claim 1, wherein to monitor the aggregate load, the virtual access function is to:
compare the monitored aggregate load to a first bandwidth utilization threshold; and
detect the first bandwidth utilization event when the monitored aggregate load increases to reach the first bandwidth utilization threshold.

5. The virtualized communication hub of claim 4, wherein the event type of the first notification message is to correspond to the bandwidth reduction event and the severity of the first notification is to correspond to the first severity level, and in response to the first notification message, the virtual set-top box is to control a transcoder of the virtual set-top box to select the second codec to encode a data stream to stream the digital video to reduce an output bandwidth of the virtual set-top box to stream the digital media.

6. The virtualized communication hub of claim 5, wherein to monitor the aggregate load, the virtual access function is further to:
compare the monitored aggregate load to a second bandwidth utilization threshold lower than the first bandwidth utilization threshold; and
detect a second bandwidth utilization event when the monitored aggregate load decreases to reach the second bandwidth utilization threshold.

7. The virtualized communication hub of claim 6, wherein in response to the second bandwidth utilization event, the virtual access function is to send a second notification message to the virtual set-top box, the second notification message to include (i) a second event type corresponding to a bandwidth enhancement event and (ii) a second severity corresponding to the first severity level, and in response to the second notification message, the virtual set-top box is to control the transcoder to switch from the second codec to the first codec to encode the data stream to stream the digital media.

8. The virtualized communication hub of claim 7, wherein to monitor the aggregate load, the virtual access function is further to:
compare the monitored aggregate load to a third bandwidth utilization threshold higher than the first bandwidth utilization threshold; and
detect a third bandwidth utilization event when the monitored aggregate load increases to reach the third bandwidth utilization threshold.

9. The virtualized communication hub of claim 8, wherein in response to the third bandwidth utilization event, the virtual access function is to send a third notification message to the virtual set-top box, the third notification message to include (i) a third event type corresponding to the bandwidth reduction event and (ii) a third severity corresponding to the second severity level, and in response to the third notification message, the virtual set-top box is to control the transcoder to select the third codec to encode the data stream to stream the digital media.

10. The virtualized communication hub of claim 9, wherein to monitor the aggregate load, the virtual access function is further to:
compare the monitored aggregate load to a fourth bandwidth utilization threshold lower than the third bandwidth utilization threshold but higher than the first bandwidth utilization threshold; and
detect a fourth bandwidth utilization event when the monitored aggregate load decreases to reach the fourth bandwidth utilization threshold.

11. The virtualized communication hub of claim 10, wherein in response to the fourth bandwidth utilization event, the virtual access function is to send a fourth notification message to the virtual set-top box, the fourth notification message to include (i) a fourth event type corresponding to the bandwidth enhancement event and (ii) a fourth severity corresponding to the second severity level, and in response to the fourth notification message, the virtual set-top box is to control the transcoder to switch from the third codec to the second codec to encode the data stream to stream the digital media.

12. A method to control digital video bandwidth utilization with a virtualized communication hub implemented by a server cluster, the method comprising:
monitoring, with a virtual access function of the virtualized communication hub, an aggregate load on a broadband access medium to detect bandwidth utilization events, a first bandwidth utilization event associated with (i) an event type from among at least two possible event types and (ii) a severity from among at least two possible severity levels;
sending, from the virtual access function, a first notification message to a virtual set-top box of the virtualized communication hub in response to detecting the first bandwidth utilization event, the first notification message including (i) the event type and (ii) the severity associated with the first bandwidth utilization event;
reserving, with the virtual access function, bandwidth of the broadband access medium for use by the virtual set-top box to stream digital media, the reserving in response to a reservation request from the virtual set-top box after the first notification message is sent;
streaming, with the virtual set-top box, the digital media with a first codec associated with a first output bandwidth;
processing, with the virtual set-top box, the first notification message to determine the event type and the severity associated with the first bandwidth utilization event; and
in response to determining that the event type corresponds to a bandwidth reduction event, switching from the first codec to one of a second codec or a third codec based on the severity associated with the first bandwidth utilization event, the second codec associated with a second output bandwidth lower than the first output bandwidth, the third codec associated with a third output bandwidth lower than the second output bandwidth, the switching including:
switching, at the virtual set-top box, from the first codec to the second codec to stream the digital media from the virtual set-top box to a physical set-top box via the broadband access medium in response to the severity corresponding to a first severity level; and
switching, at the virtual set-top box, from the first codec to the third codec to stream the digital media in response to the severity corresponding to a second severity level.

13. The method of claim 12, further including, in response to an access request message by the virtual access function from the virtual set-top box prior to the first notification message being sent, registering the virtual set-top box with the virtual access function to permit the virtual set-top box to receive notification messages.

14. The method of claim 12, further including, in response to a second bandwidth utilization event:
adjusting the bandwidth of the broadband access medium reserved for use by the virtual set-top box to stream the digital media; and
sending a second notification message from the virtual access function to the virtual set-top box, the virtual set-top box to further adjust an output bandwidth of the virtual set-top box to stream the digital media based on the second notification message.

15. The method of claim 12, wherein the monitoring of the aggregate load includes:
  comparing the monitored aggregate load to a first bandwidth utilization threshold; and
  detecting the first bandwidth utilization event when the monitored aggregate load increases to reach the first bandwidth utilization threshold.

16. The method of claim 15, wherein the event type of the first notification message corresponds to the bandwidth reduction event and the severity of the first notification corresponds to the first severity level, and the switching includes controlling a transcoder of the virtual set-top box to select the second codec to encode a data stream to stream the digital video to reduce an output bandwidth of the virtual set-top box to stream the digital media.

17. A tangible computer readable storage medium comprising computer readable instructions which, when executed, cause one or more processors of a server cluster to at least:
  monitor, with a virtual access function of a virtualized communication hub implemented by the server cluster, an aggregate load on a broadband access medium to detect bandwidth utilization events, a first bandwidth utilization event associated with (i) an event type from among at least two possible event types and (ii) a severity from among at least two possible severity levels;
  send, from the virtual access function, a first notification message to a virtual set-top box of the virtualized communication hub in response to detecting the first bandwidth utilization event, the first notification message including (i) the event type and (ii) the severity associated with the first bandwidth utilization event;
  reserve, with the virtual access function, bandwidth of the broadband access medium for use by the virtual set-top box to stream digital media, the virtual access function to reserve the bandwidth of the broadband access medium in response to a reservation request from the virtual set-top box after the first notification message is sent;
  process the first notification message to determine the event type and the severity associated with the first bandwidth utilization event;
  stream, from the virtual set-top box, the digital media with a first codec associated with a first output bandwidth; and
  in response to determining that the event type corresponds to a bandwidth reduction event, switch from the first codec to one of a second codec or a third codec based on the severity associated with the first bandwidth utilization event, the second codec associated with a second output bandwidth lower than the first output bandwidth, the third codec associated with a third output bandwidth lower than the second output bandwidth, the instructions to cause the one or more processors to:
    switch, at the virtual set-top box, from the first codec to the second codec to stream the digital media from the virtual set-top box to a physical set-top box via the broadband access medium in response to the severity corresponding to a first severity level; and
    switch, at the virtual set-top box, from the first codec to the third codec to stream the digital media in response to the severity corresponding to a second severity level.

18. The storage medium of claim 17, wherein the computer readable instructions, when executed, further cause the one or more processors of the server cluster to register, in response to an access request message received by the virtual access function from the virtual set-top box prior to the first notification message being sent, the virtual set-top box with the virtual access function to permit the virtual set-top box to receive notification messages.

19. The storage medium of claim 17, wherein the computer readable instructions, when executed, cause the one or more processors of the server cluster to monitor the aggregate load by:
  comparing the monitored aggregate load to a plurality of bandwidth utilization thresholds;
  detecting the first bandwidth utilization event when the monitored aggregate load increases to reach a first bandwidth utilization threshold;
  detecting a second bandwidth utilization event when the monitored aggregate load decreases to reach a second bandwidth utilization threshold lower than the first bandwidth utilization threshold;
  detecting a third bandwidth utilization event when the monitored aggregate load increases to reach a third bandwidth utilization threshold higher than the first bandwidth utilization threshold; and
  detecting a fourth bandwidth utilization event when the monitored aggregate load decreases to reach a fourth bandwidth utilization threshold lower than the third bandwidth utilization threshold but higher than the first bandwidth utilization threshold, the fourth bandwidth utilization event associated with the monitored aggregate load having reached the fourth bandwidth utilization threshold.

20. The storage medium of claim 19, wherein the event type of the first notification message is to correspond to the bandwidth reduction event and the severity of the first notification corresponds to the first severity level, the computer readable instructions, when executed, cause the one of more processors of the server cluster to control a transcoder of the virtual set-top box to select the second codec to encode a data stream to stream the digital video to reduce an output bandwidth of the virtual set-top box to stream the digital media in response to the first notification message, and the computer readable instructions, when executed, further cause the one of more processors of the server cluster to:
  in response to the second bandwidth utilization event, (a) send a second notification message from the virtual access function to the virtual set-top box, the second notification message to include (i) a second event type corresponding to a bandwidth enhancement event and (ii) a second severity corresponding to the first severity level, and (b) control the transcoder to switch from the second codec to the first codec to encode the data stream to stream the digital media;
  in response to the third bandwidth utilization event, (c) send a third notification message from the virtual access function to the virtual set-top box, the third notification message to include (iii) a third event type corresponding to the bandwidth reduction event and (iv) a third severity corresponding to the second severity level, and (d) control the transcoder to select the third codec to encode the data stream to stream the digital media; and
  in response to the fourth bandwidth utilization event, (e) send a fourth notification message from the virtual access function to the virtual set-top box, the fourth notification message to include (v) a fourth event type corresponding to the bandwidth enhancement event and (vi) a fourth severity corresponding to the second severity level, and (f) control the transcoder to switch from the third codec to the second codec to encode the data stream to stream the digital media.

21. A digital video communication system comprising:
a physical set-top box associated with a subscriber location; and
a virtualized communication hub implemented by a server cluster, the virtualized communication hub including:
  a virtual set-top box to stream digital media to the physical set-top box via a broadband access medium, the virtual set-top box including a first codec associated with a first output bandwidth, a second codec associated with a second output bandwidth lower than the first output bandwidth, and a third codec associated with a third output bandwidth lower than the second output bandwidth;
  means for monitoring an aggregate load on the broadband access medium to detect bandwidth utilization events, a first bandwidth utilization event associated with an event type from among at least two possible event types and a severity from among at least two possible severity levels;
  means for sending a first notification message to the virtual set-top box in response to detecting the first bandwidth utilization event, the first notification message including the event type and the severity associated with the first bandwidth utilization event; and
  means for reserving bandwidth of the broadband access medium for use by the virtual set-top box to stream the digital media in response to a reservation request from the virtual set-top box after the first notification message is sent,
the virtual set-top box structured to:
  stream the digital media with the first codec associated with the first output bandwidth;
  process the first notification message to determine the event type and the severity associated with the first bandwidth utilization event; and
  in response to a determination that the event type corresponds to a bandwidth reduction event, switch from the first codec to one of the second codec or the third codec based on the severity associated with the first bandwidth utilization event, the virtual set-top box structured to switch from the first codec to the second codec to stream the digital media with the second output bandwidth associated with the second codec in response to the severity corresponding to a first severity level, the virtual set-top box structured to switch from the first codec to the third codec to stream the digital media with the third output bandwidth in response to the severity corresponding to a second severity level.

22. The system of claim 21, further including means for registering, in response to an access request message from the virtual set-top box, the virtual set-top box to receive notification messages prior to the first notification message being sent.

* * * * *